United States Patent
Langhammer et al.

(10) Patent No.: US 12,135,955 B2
(45) Date of Patent: Nov. 5, 2024

(54) SYSTEMS AND METHODS FOR LOW LATENCY MODULAR MULTIPLICATION

(71) Applicant: Intel Corporation, Santa Clara, CA (US)

(72) Inventors: Martin Langhammer, Alderbury (GB); Bogdan Mihai Pasca, Toulouse (FR)

(73) Assignee: Intel Corporation, Santa Clara, CA (US)

(*) Notice: Subject to any disclaimer, the term of this patent is extended or adjusted under 35 U.S.C. 154(b) by 801 days.

(21) Appl. No.: 17/133,815

(22) Filed: Dec. 24, 2020

(65) Prior Publication Data

US 2021/0117157 A1 Apr. 22, 2021

(51) Int. Cl.
  *G06F 7/527* (2006.01)
  *G06F 7/507* (2006.01)
  *G06F 7/544* (2006.01)

(52) U.S. Cl.
  CPC ............ *G06F 7/5275* (2013.01); *G06F 7/507* (2013.01); *G06F 7/5277* (2013.01); *G06F 7/5443* (2013.01)

(58) Field of Classification Search
  CPC . G06F 7/50; G06F 7/501; G06F 7/502; G06F 7/504; G06F 7/5045; G06F 7/506; G06F 7/507; G06F 7/523; G06F 7/527; G06F 7/5275; G06F 7/5277; G06F 7/5318; G06F 7/5443; G06F 7/722; G06F 7/727
  See application file for complete search history.

(56) References Cited

U.S. PATENT DOCUMENTS

| | | | | |
|---|---|---|---|---|
| 6,151,393 A | * | 11/2000 | Jeong | G06F 7/722 708/492 |
| 2016/0246571 A1 | * | 8/2016 | Walters, III | G06F 7/5057 |
| 2019/0042197 A1 | * | 2/2019 | Langhammer | G06F 7/5443 |

FOREIGN PATENT DOCUMENTS

GB       1216559 A  *  6/1968

OTHER PUBLICATIONS

W.P. Hays, DSPs: Back to the Future, Queue Focus DSPs, ACM, 2004 (Year: 2004).*
M. Langhammer et al., Low-Latency Modular Exponentiation for FPGAs, 2022 IEEE 30th Annuyal International Sumposium on Field-Programmable Custom Computing Machines (FCCM), IEEE 2022 (Year: 2022).*

* cited by examiner

*Primary Examiner* — Emily E Larocque
(74) *Attorney, Agent, or Firm* — Fletcher Yoder, P.C.

(57) ABSTRACT

An integrated circuit device includes multiplier circuitry configured to determine a plurality of columns of subproducts by multiplying a plurality of values. Each column of the plurality of columns includes one or more subproducts of a plurality of subproducts. The integrated circuit device also includes adder circuitry configured to determine a plurality of sums, each sum being a sum of one column of the plurality of columns. A first portion of the adder circuitry associated with a first column of the plurality of columns is configured to receive a first value and second value that are associated with the first column and a third value associated with a second column of the plurality of columns that differs from the first column. The third value is a carry-out value generated by a second portion of the adder circuitry associated with the second column of the plurality of columns.

20 Claims, 13 Drawing Sheets

SYSTEMS AND METHODS FOR LOW LATENCY MODULAR MULTIPLICATION

BACKGROUND

The present disclosure relates generally to integrated circuit (IC) devices such as programmable logic devices (PLDs). More particularly, the present disclosure relates to techniques for performing modular multiplication operations on integrated circuit devices, including programmable logic devices such as field programmable gate arrays (FPGAs).

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

Integrated circuit devices may be utilized for a variety of purposes or applications, such as digital signal processing, machine learning, and cryptocurrency or other blockchain-related applications. Programmable logic devices may be utilized to perform these functions, for example, using particular circuitry (e.g., processing blocks). In some cases, particular circuitry that is effective for performing multiplication operations (e.g., modular multiplication operations) may perform these operations with a latency that is undesirably high, the particular circuitry may occupy an undesirable amount of area on an integrated circuit device, or both.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
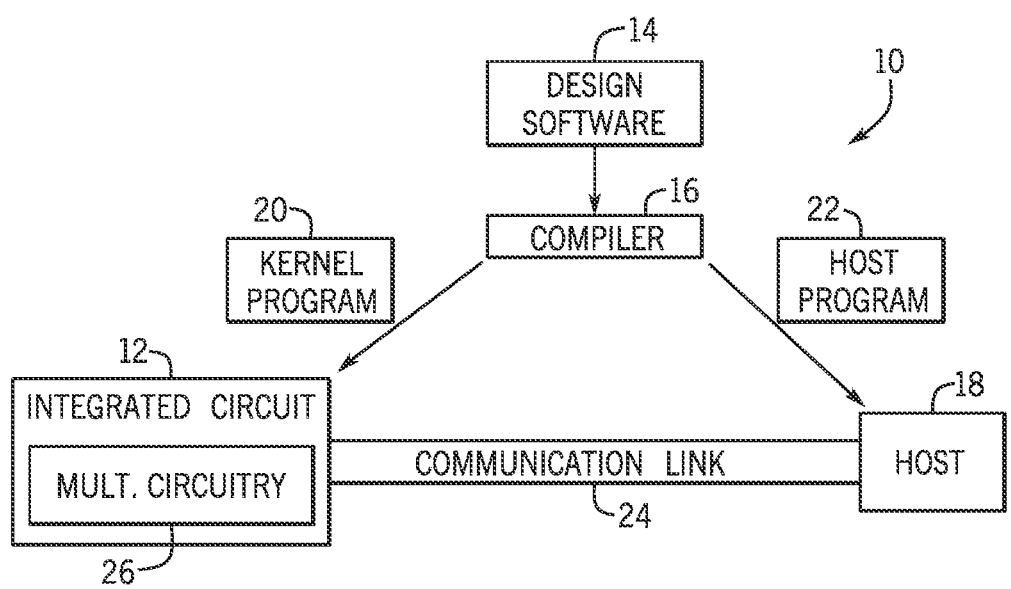
FIG. 1 is a block diagram of a system that may implement arithmetic operations using multiplier circuitry, in accordance with an embodiment of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "including" and "having" are intended to be inclusive and mean that there may be additional elements other than the listed elements. Additionally, it should be understood that references to "some embodiments," "embodiments," "one embodiment," or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

As various applications such as machine leaning, artificial intelligence applications, cryptocurrency-related applications, and digital signal processing (DSP) applications have become ever more prevalent, there is an increasing desire to perform various operations associated with these applications in more efficient manners. For example, there may be a desire to alter (e.g., reduce) the amount of circuitry utilized to perform one or more of these operations in order to provide space for circuitry to perform one or more other operations. Similarly, there may be a desire to decrease the amount of time used to perform the operations associated with these applications. In other words, performing these operations in a lower latency manner may be desirable, for example, to enable the operations to be performed more quickly. Keeping this in mind, the presently described techniques relate to reducing latency associated with modular multiplication operations as well as reducing the amount of circuitry utilized to perform modular multiplication operations. For example, modular multiplication operations may be performed by an integrated circuit device, including programmable logic devices such as FPGAs, application-specific standard products (ASSPs), and application-specific integrated circuit (ASICs) when utilized for machine leaning, artificial intelligence applications, and cryptocurrency-related applications. As discussed below, circuitry included on an integrated circuit device (e.g., DSP circuitry, multiplication circuitry, addition circuitry) perform modular multiplication in a manner that reduces the latency associated with performing these operations while also reducing the amount of the area on the integrated circuit device utilized to perform these operations.

As a more specific example, integrated circuit devices may perform mathematical operations associated with variable delay functions (VDFs), which can be utilized as proofs of work utilized in cryptographic applications, such as cryptocurrency or blockchain applications. In general, a proof of work is a proof in which one party (e.g., a party in operating or associated with one or more integrated circuit devices being utilized for cryptocurrency application) proves to others (one or more parties of cryptocurrency transactions) that a certain amount of computational effort has been expended. As such, VDFs have a certain minimum latency. That is, a VDF cannot be accelerated or parallelized beyond best known implementation. Accordingly, it would be beneficial to determine the best (e.g., optimal or quickest) implementation for a VDF. In many cases, modular multiplication and other mathematical operations (e.g., addition) are performed by circuitry included in integrated circuit devices as part of determining such an implementation. Accordingly, by performing modular multiplication (and operations performed as part of performing modular multiplication) in a lower latency manner, integrated circuit devices may be able to determine better (e.g., optimal or quicker) solutions to VDFs, thereby enhancing the performance of the integrated circuit device when utilized for, among other things, cryptocurrency and blockchain applications.

With the foregoing in mind, FIG. 1 is a block diagram of a system 10 that may implement arithmetic operations, such as modular multiplication, using multiplier circuitry. A designer may desire to implement functionality, such as the large precision arithmetic operations of this disclosure, on an integrated circuit device 12 (such as a field-programmable gate array (FPGA) or an application-specific integrated circuit (ASIC)). In some cases, the designer may specify a high-level program to be implemented, such as an OpenCL program, which may enable the designer to more efficiently and easily provide programming instructions to configure a set of programmable logic cells for the integrated circuit device 12 without specific knowledge of low-level hardware description languages (e.g., Verilog or VHDL). For example, because OpenCL is quite similar to other high-level programming languages, such as C++, designers of programmable logic familiar with such programming languages may have a reduced learning curve than designers that are required to learn unfamiliar low-level hardware description languages to implement new functionalities in the integrated circuit device 12.

Designers may implement their high-level designs using design software 14, such as a version of Intel® Quartus® by INTEL CORPORATION. The design software 14 may use a compiler 16 to convert the high-level program into a lower-level description. The compiler 16 may provide machine-readable instructions representative of the high-level program to a host 18 and the integrated circuit device 12. The host 18 may receive a host program 22 which may be implemented by the kernel programs 20. To implement the host program 22, the host 18 may communicate instructions from the host program 22 to the integrated circuit device 12 via a communications link 24, which may be, for example, direct memory access (DMA) communications or peripheral component interconnect express (PCIe) communications. In some embodiments, the kernel programs 20 and the host 18 may enable configuration of multiplier circuitry 26 on the integrated circuit device 12. The multiplier circuitry 26 may include circuitry that is utilized to perform several different operations. For example, the multiplier circuitry 26 may include one or more multipliers and adders that are respectively utilized to perform multiplication and addition operations. Accordingly, the multiplier circuitry 26 may include circuitry to implement, for example, operations to perform multiplication for AI or non-AI data processing (e.g., modular multiplication, matrix-matrix multiplication, matrix-vector multiplication, vector-vector multiplication). Additionally, in some embodiments, the multiplier circuitry 26 may include one or more DSP blocks, and the integrated circuit device 12 may include many (e.g., hundreds or thousands) DSP blocks. The DSP blocks may be communicatively coupled to another such that data outputted from one DSP block may be provided to other DSP blocks. Furthermore, adder circuitry may be included in the multiplier circuitry 26, for example, to add subproducts that are determined when performing multiplication operations. Indeed, as discussed in examples below, the multiplier circuitry 26 may perform multiplication involving relatively large values (e.g., multipliers and/or multiplicands) by decomposing one or more of the values into several smaller values, generating subproducts, and adding the subproducts. When performing modular multiplication, modulus values of one or more sums associated with the subproducts (e.g., sums of columns of subproducts) may also be determined.

While the techniques above discussion described to the application of a high-level program, in some embodiments, the designer may use the design software 14 to generate and/or to specify a low-level program, such as the low-level hardware description languages described above. Further, in some embodiments, the system 10 may be implemented without a separate host program 22. Moreover, in some embodiments, the techniques described herein may be implemented in circuitry as a non-programmable circuit design. For example, the multiplier circuitry 26 may be formed at least partially in a non-programmable portion of a programmable logic device (e.g., an FPGA or ASIC). Furthermore, in other embodiments, the multiplier circuitry 26 may be partially implemented in portions of the integrated circuitry device 12 that are programmable by the end user (e.g., soft logic) and in parts of the integrated circuit device 12 that are not programmable by the end user (e.g., hard logic). For example, DSP blocks may be implemented in hard logic, while other circuitry included in the multiplier circuitry, including the circuitry utilized for routing data between portions of the multiplier circuitry, may be implemented in soft logic. Thus, embodiments described herein are intended to be illustrative and not limiting.

Figure 2:
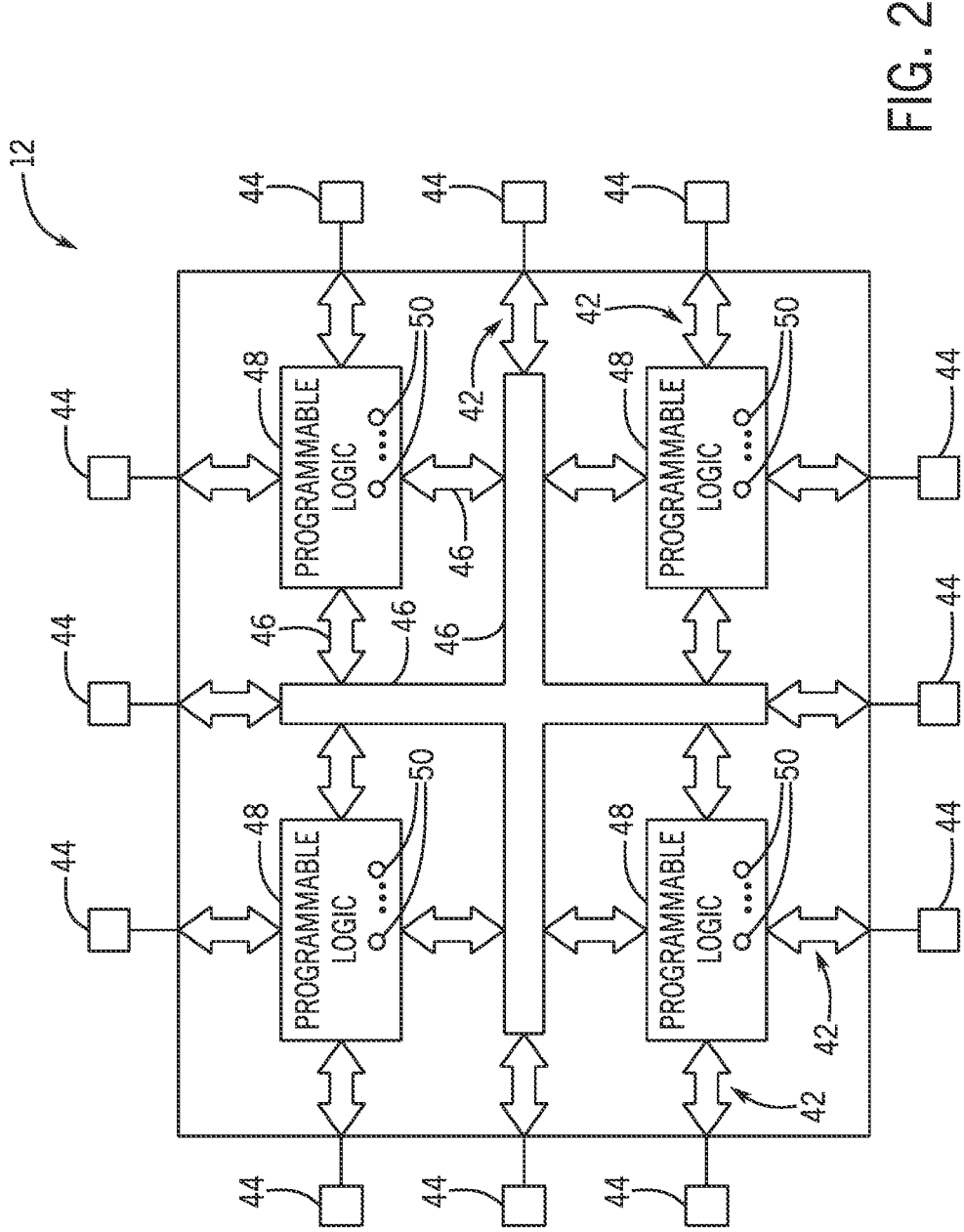
FIG. 2 is a block diagram of an example of the integrated circuit device of FIG. 1, in accordance with an embodiment of the present disclosure.

Turning now to a more detailed discussion of the integrated circuit device 12, FIG. 2 illustrates an example of the integrated circuit device 12 as a programmable logic device, such as a field-programmable gate array (FPGA). Further, it should be understood that the integrated circuit device 12 may be any other suitable type of integrated circuit device (e.g., an application-specific integrated circuit and/or application-specific standard product). As shown, the integrated circuit device 12 may have input/output circuitry 42 for driving signals off device and for receiving signals from other devices via input/output pins 44. Interconnection resources 46, such as global and local vertical and horizontal conductive lines and buses, may be used to route signals on integrated circuit device 12. Additionally, interconnection resources 46 may include fixed interconnects (conductive lines) and programmable interconnects (e.g., programmable connections between respective fixed interconnects). Programmable logic 48 may include combinational and sequential logic circuitry. For example, programmable logic 48 may include look-up tables, registers, and multiplexers. In various embodiments, the programmable logic 48 may be configured to perform a custom logic function. The programmable interconnects associated with interconnection resources may be considered to be a part of the programmable logic 48.

Programmable logic devices, which the integrated circuit device 12 may represent, may contain programmable elements 50 within the programmable logic 48. For example, as discussed above, a designer (e.g., a customer) may program (e.g., configure) the programmable logic 48 to perform one or more desired functions. By way of example, some programmable logic devices may be programmed by configuring their programmable elements 50 using mask programming arrangements, which is performed during semiconductor manufacturing. Other programmable logic devices are configured after semiconductor fabrication operations have been completed, such as by using electrical programming or laser programming to program their programmable elements 50. In general, programmable elements 50 may be based on any suitable programmable technology, such as fuses, antifuses, electrically-programmable read-only-memory technology, random-access memory cells, mask-programmed elements, and so forth.

Many programmable logic devices are electrically programmed. With electrical programming arrangements, the programmable elements 50 may be formed from one or more memory cells. For example, during programming, configuration data is loaded into the memory cells using pins 44 and input/output circuitry 42. In one embodiment, the memory cells may be implemented as random-access-memory (RAM) cells. The use of memory cells based on RAM technology is described herein is intended to be only one example. Further, because these RAM cells are loaded with configuration data during programming, they are sometimes referred to as configuration RAM cells (CRAM). These memory cells may each provide a corresponding static control output signal that controls the state of an associated logic component in programmable logic 48. For instance, in some embodiments, the output signals may be applied to the gates of metal-oxide-semiconductor (MOS) transistors within the programmable logic 48.

Figure 3:
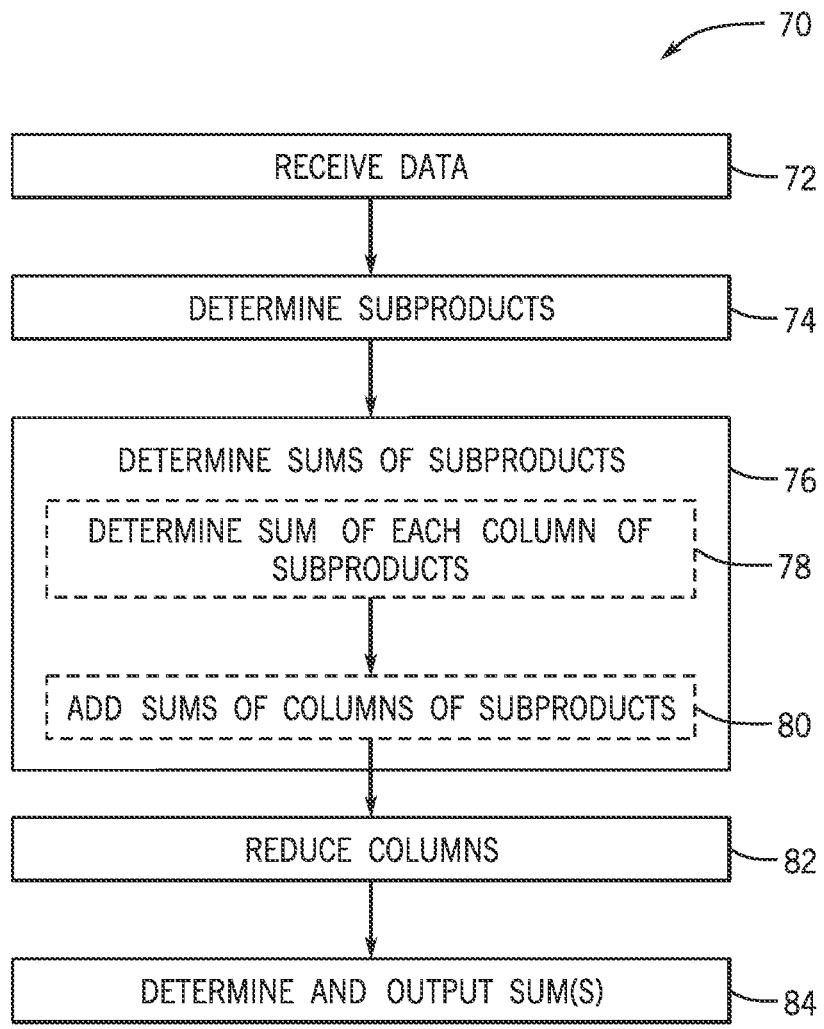
FIG. 3 is a flow diagram of a process that multiplier circuitry of the integrated circuit device of FIG. 1 may perform when conducting multiplication operations, in accordance with an embodiment of the present disclosure.

Keeping the foregoing in mind, the multiplier circuitry 26 discussed herein may be utilized for a variety of applications and to perform many different operations associated with the applications, such as multiplication and addition. For example, modular multiplication operations may be well suited for cryptocurrency applications. As discussed below, the multiplier circuitry 26 may reduce latency associated with modular multiplication operations due to the multiplier circuitry 26 itself as well as the manner in which the multiplier circuitry 26 performs modular multiplication. To help provide an overview for operations that the multiplier circuitry 26 may perform, FIG. 3 is provided. In particular, FIG. 3 is a flow diagram of a process 70 that the multiplier circuitry 26 may perform on data the multiplier circuitry 26 receives to determine a product of the inputted data. Additionally, it should be noted the operations described with respect to the process 70 are discussed in greater detail with respect to subsequent drawings. The process 70 generally includes receiving data (process block 72), determining subproducts from the received data (process block 74), and determining sums of the subproducts (process block 76), which may be done by determining a sum of each column of subproducts (sub-process block 78) and adding the sums of the columns of subproducts (sub-process block 80). The process 70 may also include reducing the columns of subproducts (process block 82) and determining and outputting one or more sums (process block 84).

At process block 72, the multiplier circuitry 26 receives data. The data may include values that will be multiplied. The data may include fixed-point data types. In some cases, the values to be multiplied may be more precise that the precision of individual portions of the multiplier circuitry 26 utilized to perform multiplication operations. For example, the multiplier circuitry 26 may include 27-bit wide DSP blocks that process values, but one or more of the values to be multiplied may include more than 27 bits (e.g., 128 bits, 256 bits, 512 bits, 1024 bits, or more than 1024 bits). In such embodiments, the multiplier circuitry 26 or integrated circuit device 12 may subdivide one or more of the values to be multiplied into several smaller values. For example, continuing with the example in which the multiplier circuitry 26 includes DSP blocks that process 27-bit values, two 128-bit values to be multiplied may each be subdivided into five sub-terms.

At process block 74, the multiplier circuitry 26 may determine subproducts. In other words, the multiplier circuitry 26 may multiply the sub-terms associated with one value (e.g., a multiplicand) by sub-terms associated with another value (e.g., a multiplier) or, in the case that only one value is divided into sub-terms, the other value. In the example above in which two 128-bit values are each subdivided into five sub-terms, twenty-five DSP blocks (e.g., a five-by-five arrangement of DSP blocks) may be utilized to multiply the sub-terms.

Figure 4:
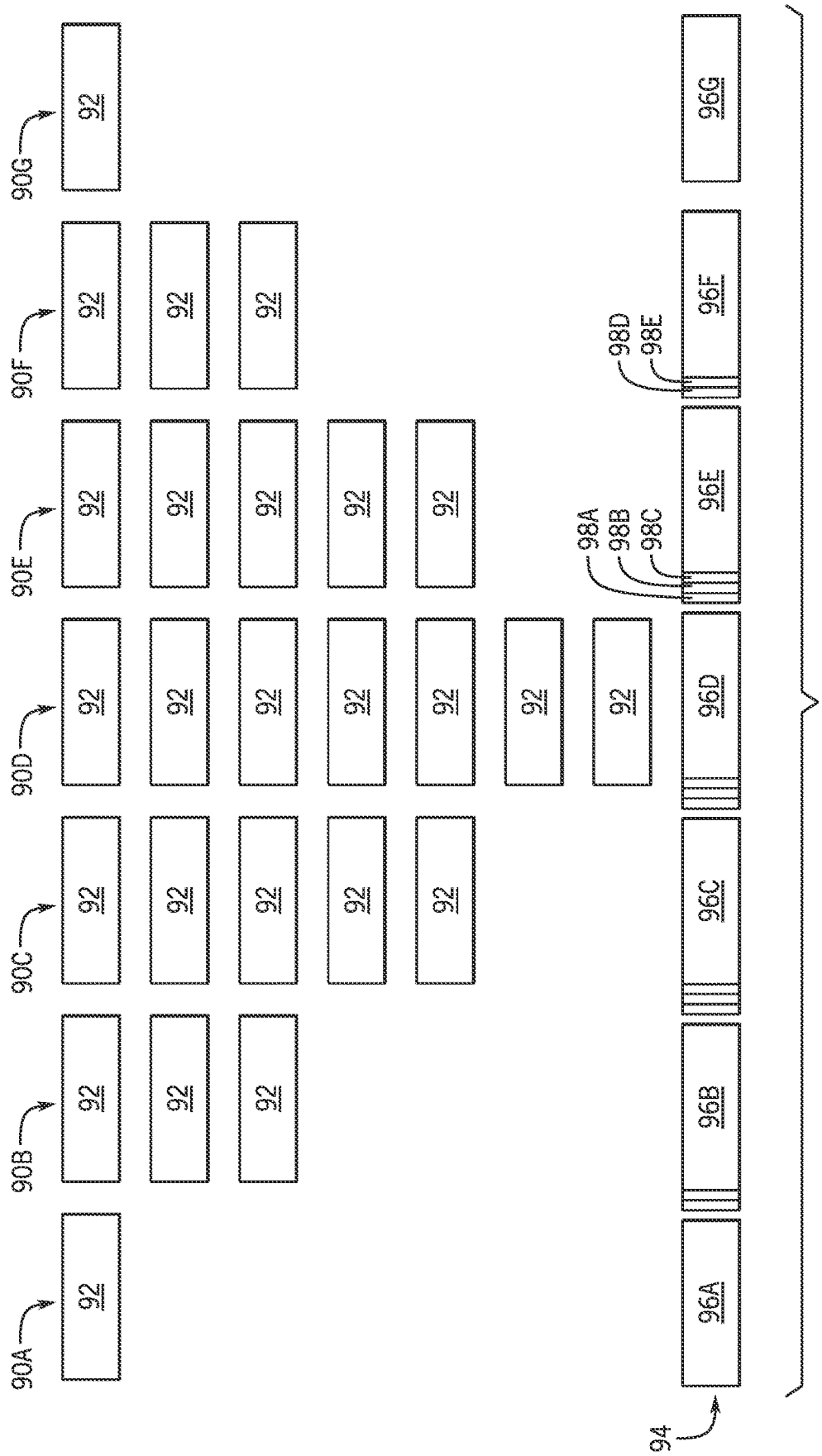
FIG. 4 is a block diagram illustrating columns of subproducts and a row of sums of the columns of subproducts, in accordance with an embodiment of the present disclosure.

To help further expand on the multiplier circuitry 26 generating subproducts, FIG. 4 is provided. In particular, FIG. 4 is a diagram illustrating columns 90 (e.g., columns 90A-90G) of subproducts 92 as well as a row 94 of sums 96 (e.g., sums 96A-96G) of the columns 90. More specifically, FIG. 4 includes seven columns 90 of subproducts 92. While seven columns 90 of subproducts 92 are provided, it should be noted that the number of columns 90 and subproducts 92 may differ in other embodiments. Indeed, seven columns 90 may not correspond to any particular size multiplier or decomposition (e.g., of one or more values to be multiplied). Rather, the number of columns 90 and the depth of the columns 90 (i.e., the number of subproducts 92 per column 90) may depend on the size of the values to the multiplied and how the values are subdivided (e.g., decomposed into smaller values that will be multiplied to generate the subproduct 92). For instance, in the example of two 128-bit values being decomposed into 27-bit DSP blocks (e.g., a 5×5 arrangement of DSP blocks), there would be ten columns 90 with a column depth of up to nine terms (i.e., subproducts 92). With that said, regardless of the number of columns 90, the number of subproducts 92 in each column 90 generally increases from right to left until the middle (e.g., column 90D), and then decreases again from the middle to the left, as illustrated in FIG. 4. Accordingly, while FIG. 4 includes seven columns 90 of subproducts 92 with a maximum depth of seven (e.g., the seven subproducts 92 of column 90D), the multiplication operation illustrated in FIG. 4 is merely one example. In other embodiments, fewer or more columns 90 compared to FIG. 4 may be included, and the maximum depth of the columns 90 may differ from FIG. 4.

Keeping FIG. 4 in mind while returning to FIG. 3 and the discussion of the process 70, at process block 76 the multiplier circuitry 26 may determine sums of the subproducts. In other words, adder circuitry that may be included in the multiplier circuitry 26 may add the subproducts 92 together (e.g., as part of determining the product of the two initial values to be multiplied). To determine the sums of the subproducts, the multiplier circuitry 26, at sub-block 78 may determine a sum for each column 90 of the subproducts 92 (e.g., by adding together each subproduct 92 in a particular column 90) and, at sub-block 80, add the sums of the columns 90. In other words, the multiplier circuitry 26 may add each of the subproducts in a column 90 together for each of the columns 90 and add the sums for the columns 90 together. For instance, in FIG. 4, each of the sums 96 is a sum determined by adding the subproducts 92 of a particular column 90 (i.e., the column 90 in which the given sum 96 is located). More specifically, each sum 96 may be independently determined. That is, the sums 96 may be determined without accounting for values (e.g., subproducts, sums, wordgrowth) associated with other columns.

Generally, depending on the number of columns 90 of subproducts 92 and the depth of the columns 90, wordgrowth may occur. In other words, as illustrated by bits 98 (e.g., bits 98A-98E) or any bits indicated by bars within the sums 96 (e.g., sums 96B-96F), a portion of the sums 96 may include one or more bits than a width processable by a DSP block included in the multiplier circuitry 26. For instance, in FIG. 4, the sums 96B, 96F include two bits of wordgrowth, while the sums 96C, 96D, 96E include three bits of wordgrowth. As another example, in the case of the 27-bit wide DSP block discussed above, a sum 96 of a given column 90 of subproducts 92 may include one, two, three, or four bits more than 27 bits (i.e., one, two, three, or four bits of wordgrowth). Similar to the depth of the columns, the amount of wordgrowth generally increases from the right to the middle (e.g., column 90D) and decreases from the middle to the left.

The multiplier circuitry 26 may perform further addition operations to add together the sums 96. For example, at process block 82, the multiplier circuitry 26 may reduce one or more of the sums 96 of the columns 90 by determining the modulus for each of the sums 96 that has a rank that is greater than the input argument size. In other words, each of the sums 96 that includes more bits than the subdivided values multiplied by the multiplier circuitry (which may be the same number of bits as the width of the DSP blocks utilized to determine the subproducts 92) can be replaced by its modulus. Modular reduction may be performed based on the modulus identity provided below:

$$((A+B) \bmod N) = A \bmod N + B \bmod N$$

where A and B are values to be added (e.g., two of the sums 96), "mod" is a modulo operation, and N is a value. In particular, the value of N may be an integer value determined on a case by case basis by the multiplier circuitry 26 or integrated circuit device 12, for example, based on the values of the sums 96. Accordingly, a modulus value for each of the sums 96 may be determined.

Returning to FIG. 3 and the discussion of the process 70, at process block 84, the multiplier circuitry 26 may determine and output one or more sums. For example, adder circuitry in the multiplier circuitry 26 may add values generated from performing modular reductions discussed above.

Figure 5:
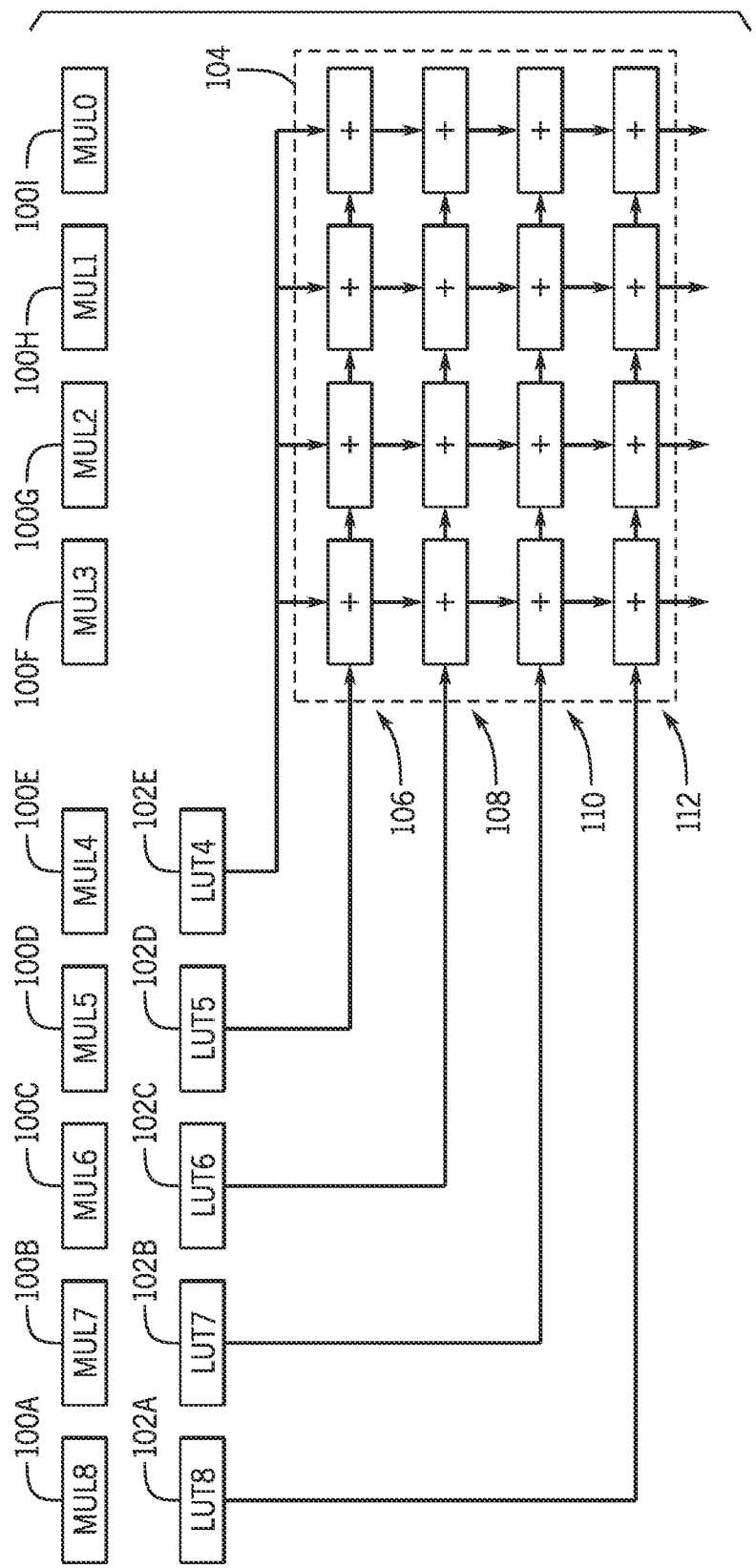
FIG. 5 is a diagram illustrating an example of generating modulus values and summing the modulus values, in accordance with an embodiment of the present disclosure.

To help expand on this discussion, FIG. 5 is provided. In particular, FIG. 5 illustrates one example of how the integrated circuit device 12 and multiplier circuitry 26 may perform the operations discussed above with respect to process blocks 82 and 84 of the process 70. For example, multiplier blocks 100 (e.g., multiplier blocks 100A-100I) may be included in the multiplier circuitry 26 and determine the subproducts 92 as well as the sums 96. Look-up tables (LUTs) 102 (e.g., LUTs 102A-102E) included in the multiplier circuitry 26 (or elsewhere in the integrated circuit device 12) may be communicatively coupled to a corresponding multiplier block 100, receive the output (e.g., a sum 96) from the multiplier block 100, perform a modulo operation on the value received from the multiplier block 100, and output a modulus value. Accordingly, the LUTs 102 may be utilized to perform modular reduction. Similar to the discussion of the columns 90 and depth of the columns 90 above, the amount of multiplier blocks 100 and LUTs 102 utilized may vary depending on the number of bits being multiplied. Thus, in other embodiments, fewer or more multiplier blocks 100 and LUTs 102 than those illustrated in FIG. 5 may be utilized.

The outputs of the LUTs 102 may be provided to adder circuitry 104, which may be included in the multiplier circuitry 26 or otherwise included in the integrated circuit device 12. In particular, a first portion (e.g., row) 106 of the adder circuitry 104 may receive values (e.g., portions of values generated by modulo operations) from two of the LUTs 102 (e.g., LUT 102D and LUT 102E), add the values, generate outputs (e.g., sums of the added values), and provide the outputs to a subsequent portion (e.g., a second portion 108) of the adder circuitry 104. The second portion 108, as well as a third portion 110 and a fourth portion 112 of the adder circuitry 104 may receive a set of values from a preceding portion of the adder circuitry 104 as well as a set of values from one of the LUTs 102 and add the two sets of values together. While the adder circuitry 104 is illustrated as having four rows (e.g., portions 106, 108, 110, 112) that each include four adders, the adder circuitry 104 may include a different number of rows as well as a different number of adders per row in other embodiments, for example, based on the number of LUTs 102, the size (e.g., number of bits) in the values to be multiplied, a width of DSP blocks, or a combination thereof.

Before continuing to discuss how the integrated circuit device 12 and multiplier circuitry 26 may perform portions of the process 70 more quickly (i.e., with less latency), it should be noted that the process 70 may include additional operations. For example, in other embodiments, the process 70 may include determining a product of two initial values and outputting such a product. More specifically, the product may be determined based on the sum(s) determined at process block 84 as well as a sum of the sums 96 of the columns 90 of subproducts 92 for which no reduction is done (e.g., at process block 82). Accordingly, the multiplier circuitry 26 and integrated circuit device 12 may determine the product of two values by performing multiplication and addition (and modulo) operations using sub-values of the two values. Additionally, it should be noted that as an alternative to the discussion provided above, each of the illustrated multiplier blocks 100 may be thought of as a sum 96, and the LUTs 102 may be thought of as modulus values output by look-up tables included in the integrated circuit device 12.

Keeping the foregoing in mind, because adding circuitry may be used to perform addition on the partial products as well as values produced from performing modular reductions, circuitry utilized to perform the multiplication of the initial values (e.g., the multiplier circuitry 26, LUTs 102, and adder circuitry 104) may utilize a larger than desired amount of area on the integrated circuit device 12. Moreover, latency may be introduced when performing multiplication operations due to the splitting of initial values to be multiplied. For example, as discussed above, when initial values are converted into several smaller values, partial products can be determined, and the partial products will be summed to determine a product of the initial values. In other words, because the number of operations is increased, the amount of time used to calculate the product of the values may be higher than if the multiplication operation were performed using circuitry configured to perform multiplication on data having the same width (e.g., number of bits) as the initial values. Additionally, relatively higher amounts of latency may occur based on the amount of data (e.g., depth of the columns 90), the order in which the columns 90 are summed, the sums 96 of the columns 90 of subproducts being determined independently of one another, or any combination thereof. Latency may also occur due to wordgrowth (e.g., due to performing reduction operations to reduce the wordgrowth).

For example, in FIG. 4, because a fourth column 90D of subproducts includes more partial products than any of the other columns 90, it may take more time for the multiplier circuitry 26 to determine the subproducts 92 of the column 90D, which means it may also take more time to determine the sum 96D of the fourth column 90D. Conversely, other columns (e.g., columns 90A, 90B, 90F, 90G) may include relatively fewer subproducts 92, meaning the sums associated with the columns 90A, 90B, 90F, 90G (e.g., sums 96A, 96B, 96F, 96G, respectively) may be determined more quickly than sums 96 associated with columns 90 having a larger number of subproducts 92.

Bearing this in mind, and turning to FIG. 5, the multiplier blocks 100 may exhibit patterns generally similar to those of the columns 90 and sums 96 of FIG. 4. For example, multiplier block 100I may be associated with a first number of subproducts 92, multiplier block 100H may be associated with a higher number of subproducts 92 (e.g., a second number of subproducts 92), multiplier block 100G may be associated with a higher number of subproducts 92 (e.g., a third number of subproducts 92), multiplier block 100F may be associated with a higher number of subproducts 92 (e.g., a fourth number of subproducts 92), multiplier block 100E may be associated with a higher number of subproducts 92 (e.g., a fifth number of subproducts 92), multiplier block 100D may be associated with a lower number of subproducts 92 (e.g., the fourth number of subproducts 92), multiplier block 100C may be associated with a lower number of subproducts 92 (e.g., the third number of subproducts 92), multiplier block 100B may be associated with a lower number of subproducts 92 (e.g., the second number of subproducts 92), and multiplier block 100A may be associated with a lower number of subproducts 92 (e.g., the first number of subproducts 92). And, as noted above, columns 90 with fewer subproducts may be summed prior to columns 90 that have more subproducts 92. Accordingly, the LUTs 100 associated with columns 90 that have more subproducts 92 may take more time to produce an output that can be provided to the adder circuitry 104 to be summed. Thus, in FIG. 5, outputs from LUT 102E and LUT 102D would take relatively more time to determine and generate than outputs from LUTs 102C, 102B, 102A.

Figure 6:
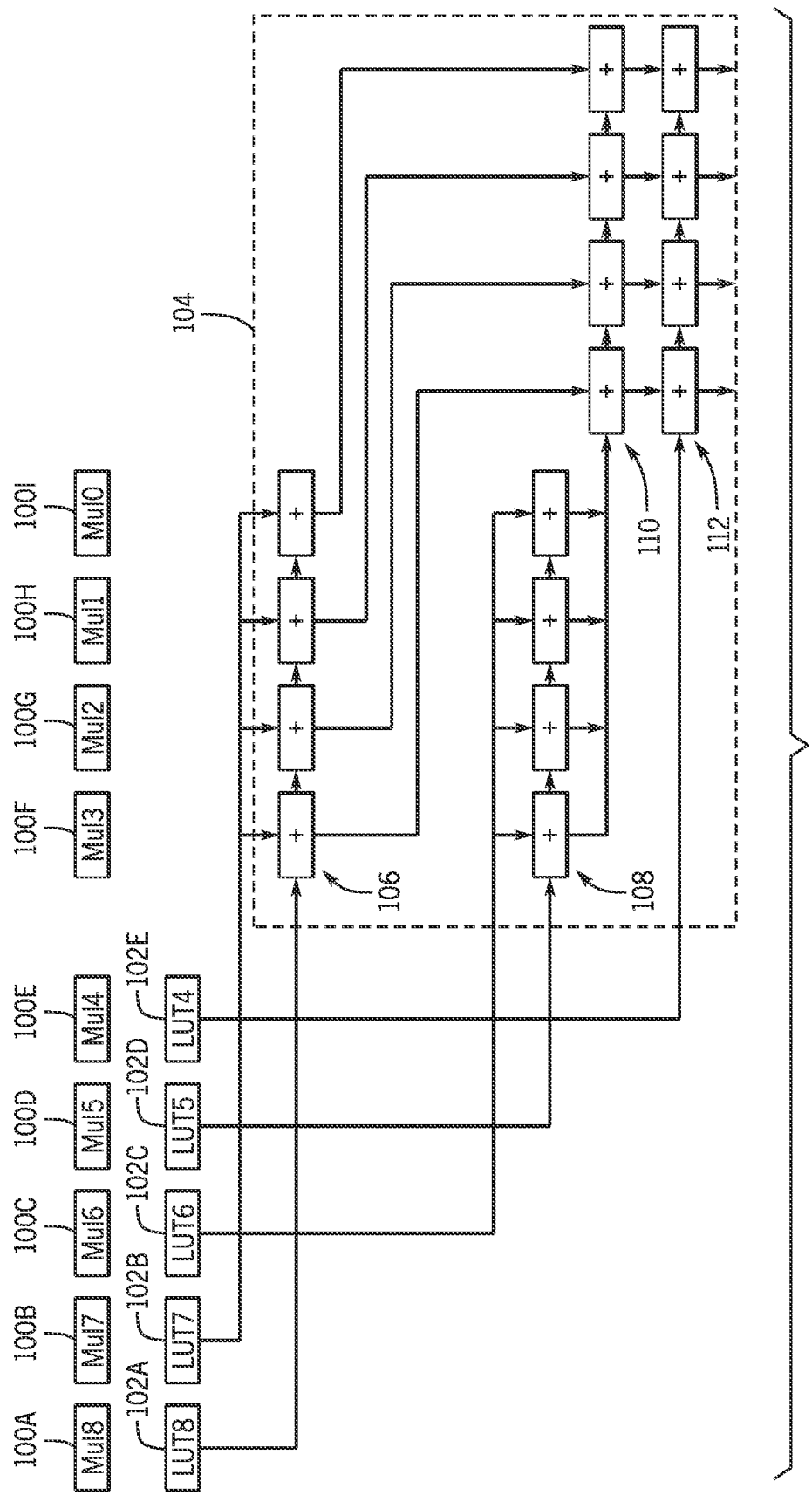
FIG. 6 is a diagram illustrating another example of generating modulus values and summing the modulus values, in accordance with another embodiment of the present disclosure.

To reduce latency, addition involving reduced values (e.g., values produced in association with process block 82 of the process 70) may be performed in an order based on an amount of delay associated with each column 90 that, for example, may correspond to the depth of the columns 90. That is, the order that addition operations are performed in may take into account the number of partial products 92 a column 90 has relative to one or more of the other columns 90. FIG. 6 is a block diagram of the same circuitry as FIG. 5 that has been arranged to perform addition in an order based on column depth. More specifically, in FIG. 6 (relative to FIG. 5), addition is performed by a first portion 106 of adder circuitry 104 using outputs from LUT 102A and LUT 102B, which would be in columns having the relatively lowest amounts of partial products 92 (e.g., compared to LUTs 102C, 102D, 102E). A second portion 108 of the adder circuitry 104 receives outputs from LUT 102C and LUT 102D and adds the inputs. The outputs from the first portion 106 and second portion 108 of the adder circuitry 104 are added by a third portion 110 of the adder circuitry 104. Additionally, a fourth portion 112 of the adder circuitry 104 adds values received from the third portion 110 of the adder circuitry 104 and LUT 102E, which is the LUT 102 associated with the longest delay due to being associated with the column having the most partial products. In this manner, each portion of the moduli generated by the LUTs 102 is input into respective portions of the adder circuitry 104, and each column is added independently (i.e., without any carries between columns). Accordingly, columns 90 may be grouped by expected delay (e.g., based on the number of partial products 92 in each column 90), and addition operations (e.g., addition involving modulus values) associated with the columns having larger delays (e.g., latency) occur further down in an adder tree (e.g., after addition associated with columns having lower expected delays). Indeed, a particular sum (e.g., values output by the first portion 106 of the adder circuitry 104) may be determined before other LUTs (e.g., LUTs 102C, 102D) output modulus values.

Figure 7:
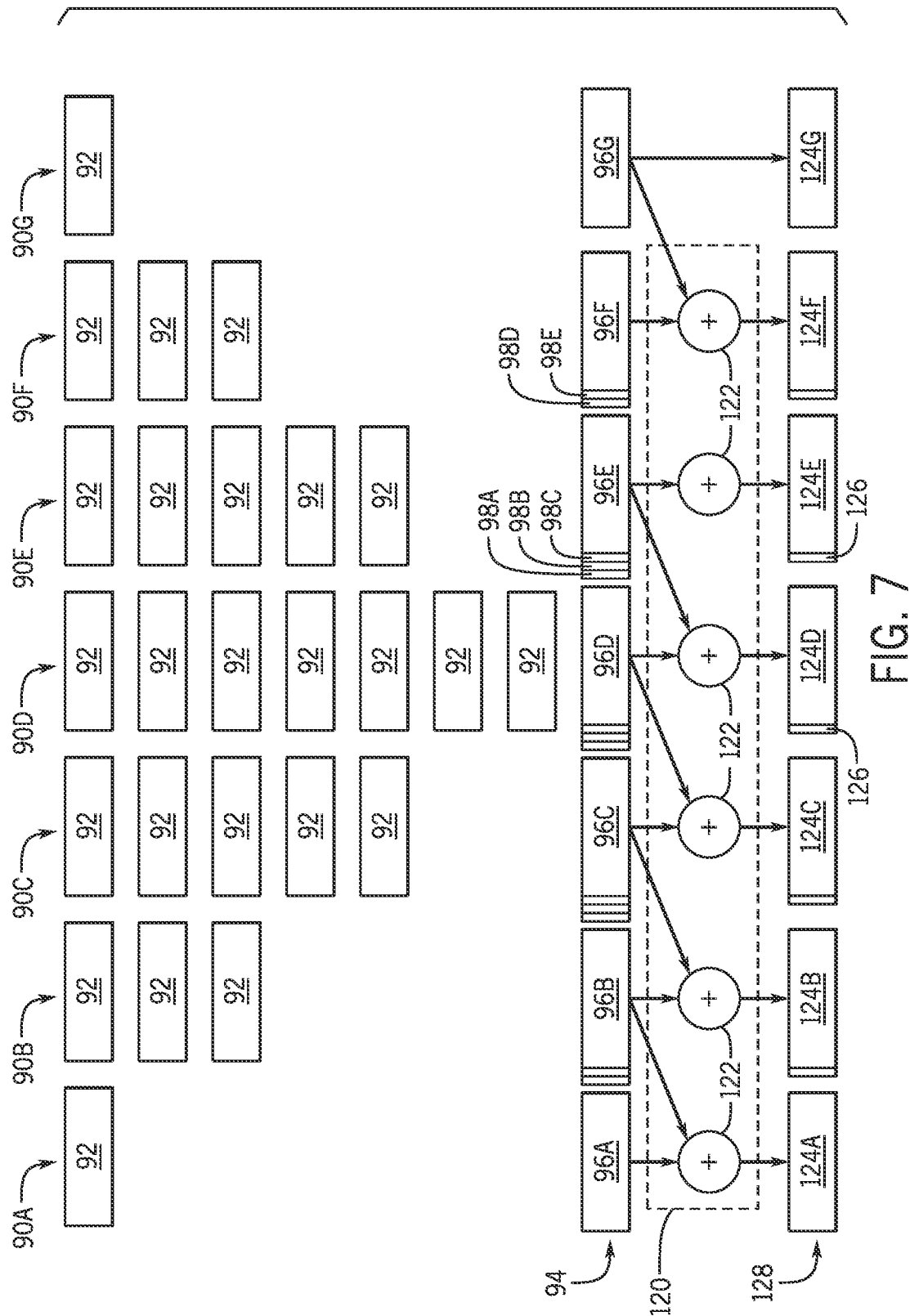
FIG. 7 is a block diagram illustrating the columns of subproducts and a row of sums of the columns of subproducts of FIG. 4 as well as reduced sums, in accordance with an embodiment of the present disclosure.

Continuing with the drawings, FIG. 7 is a block diagram generally similar to FIG. 4 that also includes adder circuitry 120 (including adders 122) that are used to reduce the sums 96 of the row 94 of sums 96. In particular, the adders 122 may be adders that receive one of the sums 96 and a carry-out value from a preceding column (e.g., a column 90 directly to the right of the column 90 that a given adder 122 is in). In other words, each of the adders 122 may add carry-out bits (e.g., bits of wordgrowth such as bits 98) from a sum 96 to bits of a next highest sum (in which case the case carry-out bits 98 may be of the same magnitude as the n least significant bits of the next highest sum, where n is the number of bit values in a given carry-out value). Accordingly, the additional carries (e.g., bits 98) in each column are reduced by adding each column independently once more. As there are no carries across columns, carry-outs from the column reductions are added to the next higher rank column. Furthermore, while sums 124 (e.g., sums 124A-124G) generated by some of the adders 122 may include an extra bit (e.g., bit 126), the extra bits 126 are a single bits instead of the several carry bits that occur in row 128 of the sums 124. These extra bits 98 may be removed by performing another round of addition. For example, any single bits 126 could be treated as carry-out values that are added to a sum from a column that is one order of magnitude larger (e.g., the column 90 directly the to the left).

However, while adding circuitry can be utilized to reduce wordgrowth and the number of carry-out bits, the adding circuitry may be relatively expensive in terms of the amount of space on the integrated circuit device 12 that the adding circuitry occupies as well as latency associated with several levels of addition to be performed. As an example, in the case where 27-bit DSP blocks will be utilized to perform multiplication involving a 128-bit multiplier, the 128-bit multiplier may be expressed according to the following 5-term polynomial expression:

$$a_4x^4+a_3x^3+a_2x^2+a_1x+a_0$$

where each a coefficient is 26-bit value. In this case, there may be six columns 90 of partial products 92 to be reduced (e.g., eliminate or reduce the amount of wordgrowth), and the maximum depth of the columns 90 is nine, meaning there may be up to nine subproducts 92 in a given column 90. In this example, up to four levels of 2-input adders may be needed to calculate the sum 96 of each column 90. Furthermore, the six columns will be reduced (e.g., by utilizing a modulus value for each column that is generated via a LUT 102), and up to three levels of 2-input adders will be needed to perform addition on the reduced values. Accordingly, seven total levels of adder circuitry may be needed in total. Ignoring the cost of DSP Blocks or modulo LUTs, adding the final carry-reducing adder circuitry may increase the amount of area utilized by adder circuitry by approximately fifteen percent.

Figure 8:
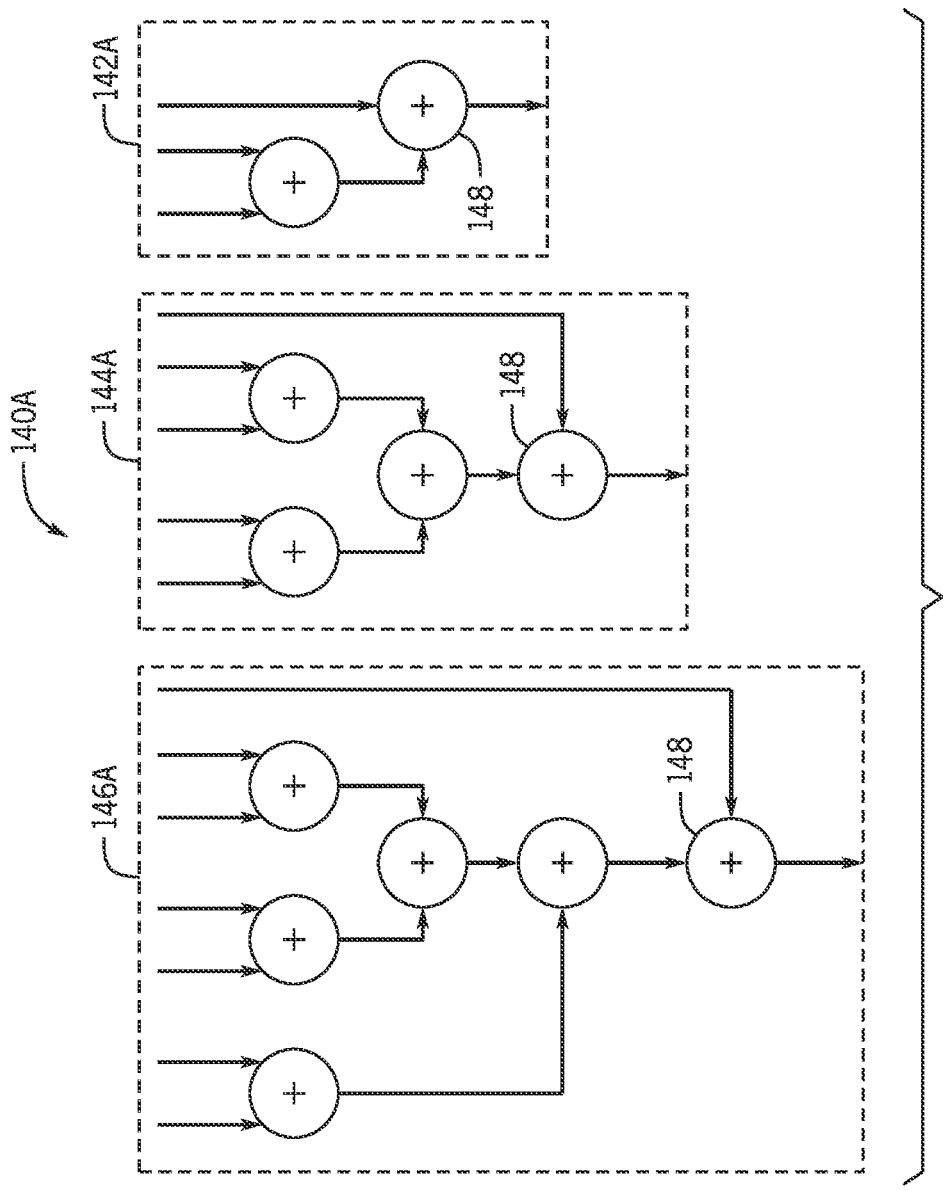
FIG. 8 is a block diagram of independent adder trees, in accordance with an embodiment of the present disclosure.

Continuing with the drawings, FIG. 8 illustrates adding circuitry 140A that may be utilized to add subproducts 92 to determine the sums 96 of the columns 90. The adding circuitry 140A may also be utilized to perform addition involving modulus values. In particular, the adding circuitry 140 includes a first adder tree 142A, a second adder tree 144A, and a third adder tree 146A that are independent of one another. Each of the adder trees 142A, 144A, 144C, includes adders 148, which are two-input adders. For example, the first adder tree 142A includes two levels of adders 148 that may determine the sum of three inputs. The second adder tree 144A includes three levels of adders 148 that may determine a sum of five inputs. The third adder tree 146A includes four levels of adders 148 that may determine a sum of seven inputs. It should be noted that the adding circuitry 140A is not limited to including adder trees 142A, 144A, 146A. In other words, in other embodiments, the adding circuitry 140A may include other adder trees. For example, the adding circuitry 140A may include a nine-input adder tree that includes four levels of adders 148. Accordingly, the adding circuitry 140A (and the adding circuitry 140B and adding circuitry 140C discussed below) may include any suitable number of adder trees, each of which may include any suitable number of adders (e.g., adders 148 or, as introduced below, ternary adders) arranged in any suitable number of levels.

An adder tree (e.g., one of the adder trees 142A, 144A, 146A) may be utilized for summing the subproducts in a column 90. Because each of the columns 90 may include a different number of subproducts, adder trees that are capable of adding different amounts of inputs may be utilized. For example, the first adder tree 142A may be utilized to add subproducts for a column 90 having three (or fewer than threes) subproducts. Because various adder trees 142A, 144A, 146A may have different amounts (e.g., vertical levels) of inputs (and adders 148) certain adder trees may more quickly generate a column sum compared to other adder trees that process more inputs. Furthermore, as noted above, when the add trees are independent of one another, meaning each adder tree sums the subproducts 92 of a column 90 without passing any values to the adder tree for a different column 90, more adding circuitry would be utilized to add the columns (e.g., to reduce wordgrowth).

Figure 9:
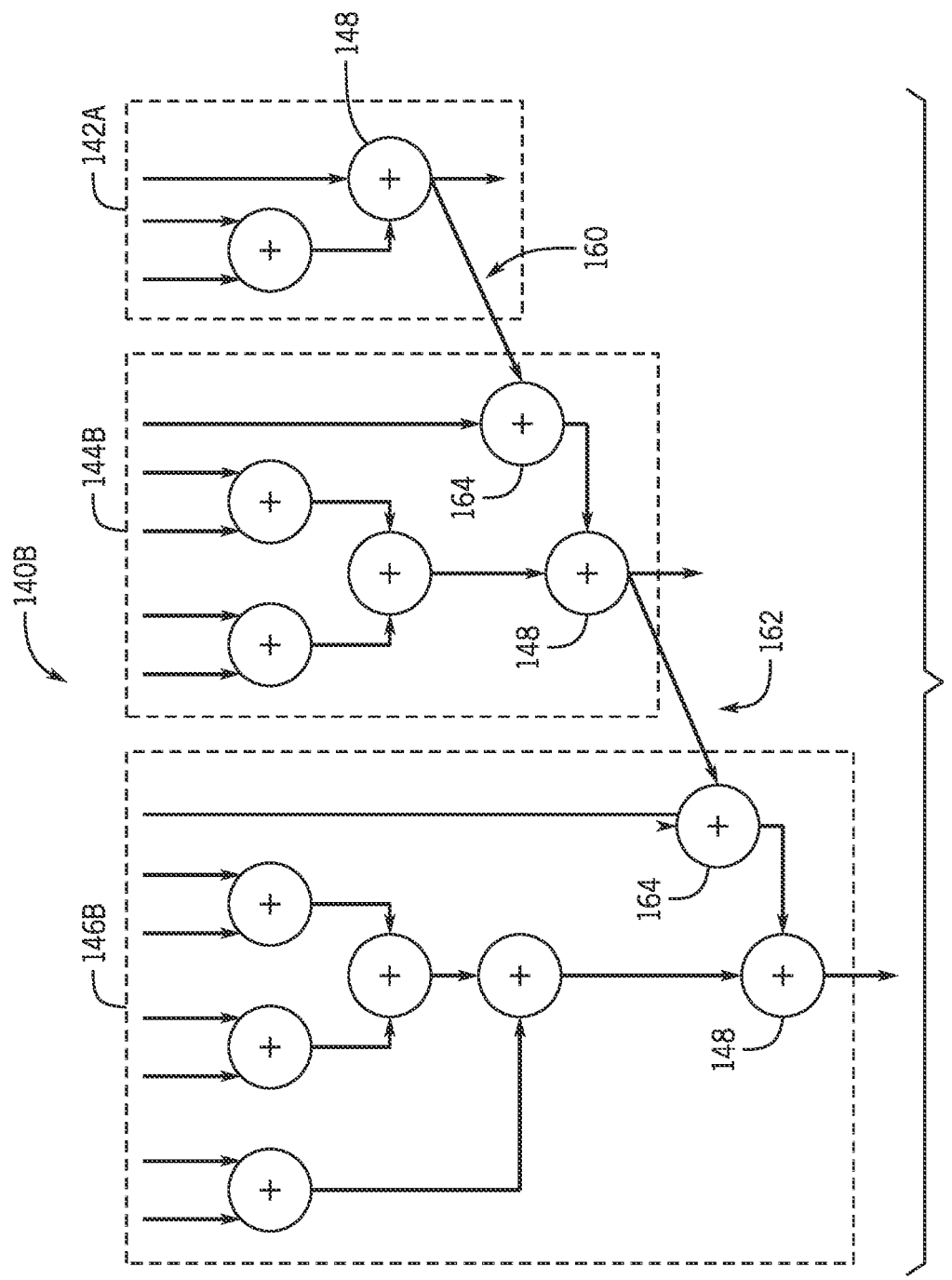
FIG. 9 is a block diagram of adder trees in which carry-out values are shared between adder trees, in accordance with an embodiment of the present disclosure.

To help account for the generally unbalanced nature of the adder trees (e.g., adder trees 142A, 144A, 146A) and reduce the latency associated with utilizing independent adder trees, FIG. 9 will now be discussed. In particular, FIG. 9 illustrates adding circuitry 140B that includes adder trees 142A, 144B, 146B, with adder trees 144B, 146B being different embodiments of the adding circuitry 144A, 146A, respectively. More particular, carry-out values (represented by diagonal lines 160, 162) from lower significance adders (e.g., adders farther to the right in FIG. 9) are added to an input (e.g., on the subproducts of the column directly to the left of the column from which the carry-out value originates). While adders 164 have been added to the adding circuitry 140B compared to the adding circuitry 140A of FIG. 8, it may be beneficial to do so because the delay of the multiplier circuitry 26 (in performing multiplication operations) is limited by the column with the longest delay.

Bearing this in mind, latency associated with the adding circuitry 140A of FIG. 8 may be reduced to a further extent by utilizing ternary adders, which are adders that can add three values. For example, in FIG. 10, adding circuitry 140C is generally similar to the adding circuitry 140A of FIG. 8, but adders 180 (e.g., adders 180A, 180B) are included in adder trees 144C, 146C are ternary adders. The adders 180 each receive three inputs and output a sum of the inputs (and, when applicable, a carry-out value). The inputs the adders 180 receive include two values (e.g., two subproducts 92) associated with the same column 90 and a carry-in value that is a carry-out value (represented by diagonal lines 182, 184) generated by another adder (e.g., adder 148 in the case of adder 180A or adder 180A in the case of adder 180B). The carry-in values input into the adders 180 are generally lower precision values (e.g., 1, 2, 3, or 4-bit values) than the other two inputs. For instance, two of the inputs may be 26-bit values, and the third input may be a carry-in value that includes one, two, three, or four bits. However, because the ternary addition involves one value that is generally much less precise (e.g., includes fewer bits) than the two other values being added, a "full-width" ternary adder that can sum three values having a larger precision (e.g., 26 bits) may be avoided. Indeed, as discussed below, ternary adders (e.g., adders 180) may be implemented using a combination of circuitry that includes a relatively low precision ternary adder (or equivalent logic), 2:2 compressor circuitry, and adding circuitry. Accordingly, the circuitry discussed below may be implemented on programmable logic devices such as FPGAs regardless of whether the programmable logic device is configured to support ternary adders. For instance, to support ternary adders, programmable logic devices may utilize more wires (e.g., to route data) compared to when supporting binary (i.e., two-input) adders. And, in some cases, an FPGA or other programmable logic device may not include enough wires (or have a high enough density of wires) to support ternary adders that are configured to add three "full-width" values. As such, the circuitry discussed below (e.g., with respect to FIG. 11 and FIG. 12) may be implemented on integrated circuit devices that do not support ternary adders.

Figure 10:
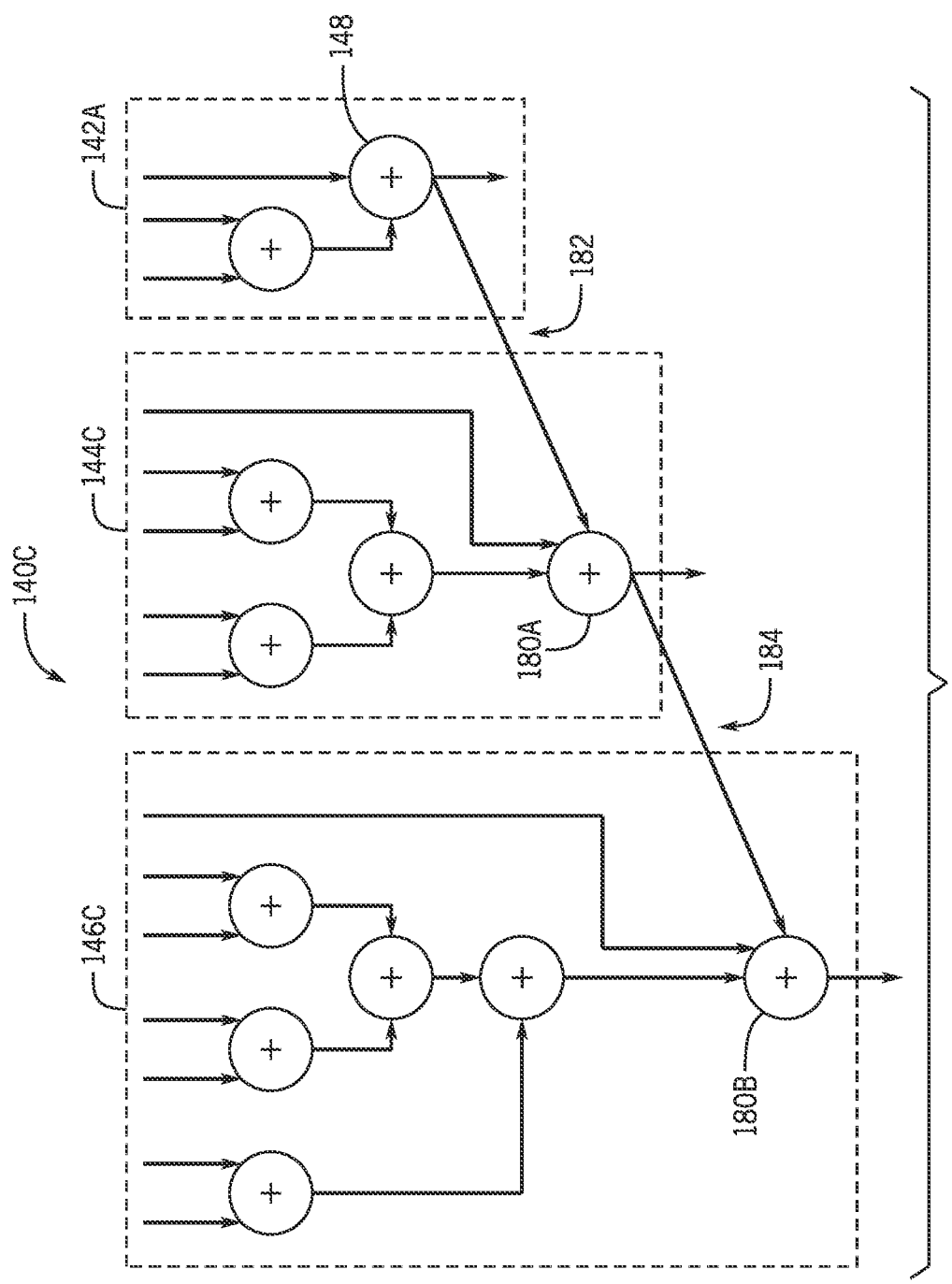
FIG. 10 is a block diagram of adder trees in which carry-out values are shared between adder trees, in accordance with another embodiment of the present disclosure.
Figure 11:
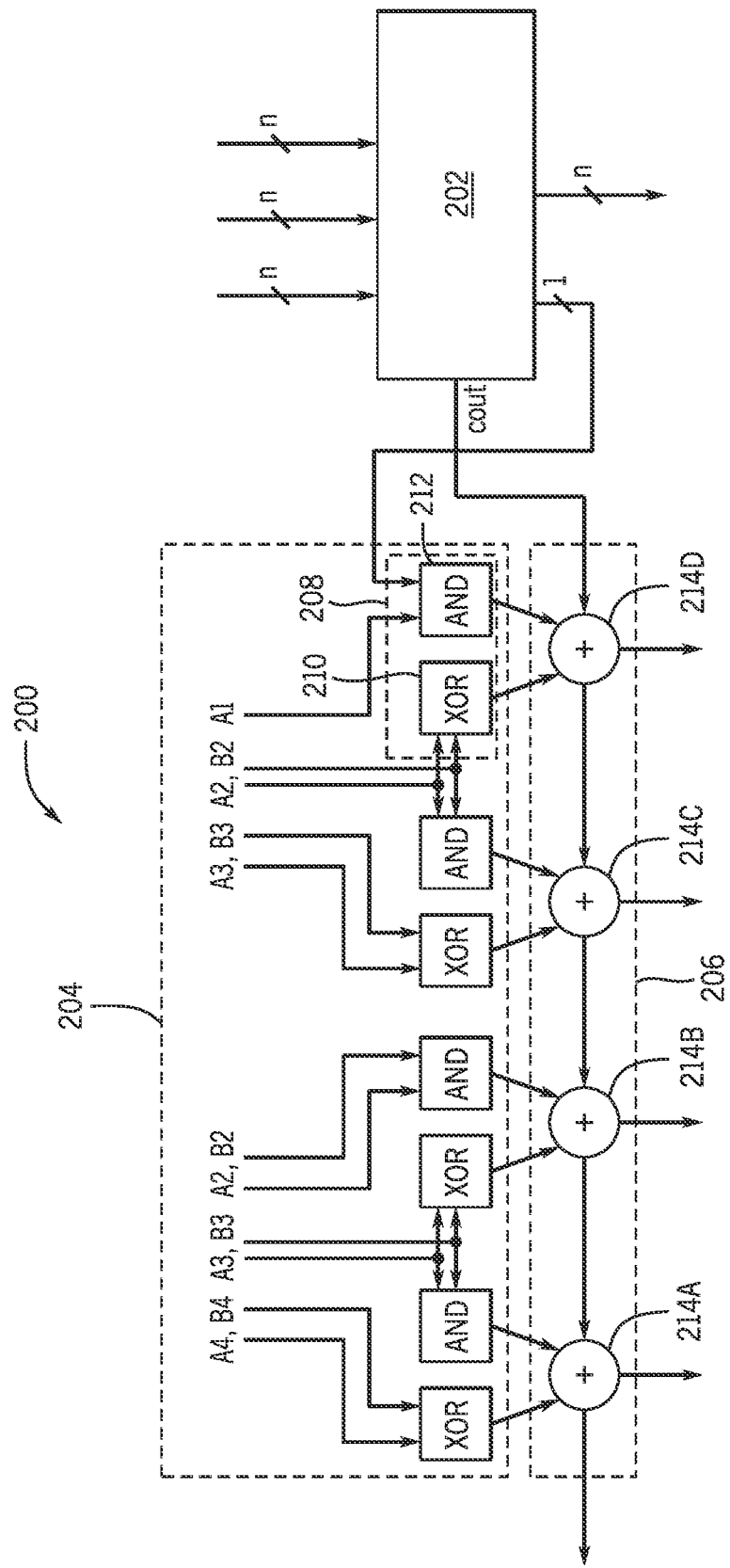
FIG. 11 is a block diagram of adder circuitry that may be included in one or more of the adder trees of FIG. 10, in accordance with embodiments of the present disclosure.

Bearing this in mind, FIG. 11 illustrates adder circuitry 200, which may be included in the adder 180 of FIG. 10. In other words, the adder circuitry 200 may be utilized as a ternary adder within adder trees, such as adder trees utilized to add subproducts 92 or sums 96 of columns. The adder circuitry 200 includes a ternary adder 202, compressor circuitry (e.g., 2:2 compressor circuitry) 204, and adder circuitry 206.

The ternary adder 202 may receive three n-bit inputs, where n is an integer value equal to the number of bits included in the carry-out from an adder (e.g., adder 148 of FIG. 10). One of the inputs is such a carry-out value, while the other two inputs are the n least significant bits of two values (e.g., value A and value B) two to be summed. For example, the other two inputs may be subproducts 92 of a column 90, and such column may include more subproducts than a column from which the carry-out value originates. In any case, such column will include subproducts that are more significant than the column from which the carry-out value is received. The ternary adder 202 may output a value that includes n bits, one bit of wordgrowth (indicated by "1"), and a carry-out value (indicated by "cout"). Accordingly, the ternary adder 202 may add a carry-out value having n bits to portions of other values (e.g., subproducts or values determined by adding together subproducts, or a combination thereof) that also include n bits.

Figure 12:
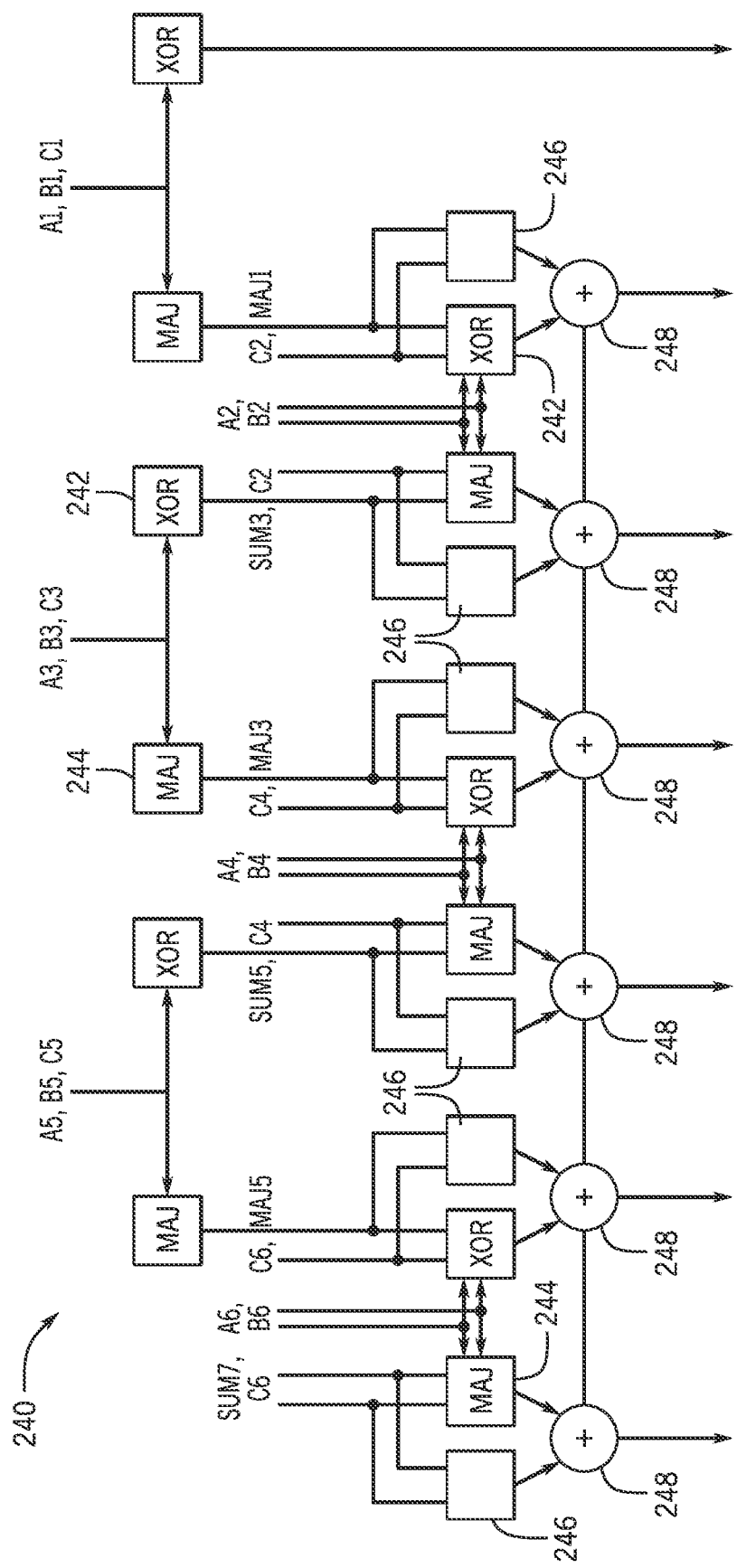
FIG. 12 is a block diagram of the ternary adder circuitry of FIG. 11, in accordance with embodiments of the present disclosure.

The ternary adder 202 may be implemented in several different ways, typically depending on the value of n. For example, the ternary adder 202 may be implemented as a lookup table when n is a relatively smaller number of bits, such as one or two bits. The lookup table may be implemented in soft logic of the integrated circuit device 12. As a more specific example, a LUTE may be utilized when n is two. In other embodiments, including embodiments directed to inputs having other values of n bits, other circuitry of the integrated circuit device 12 may be utilized, such as logic implemented in soft logic of the integrated circuit device 12 when the integrated circuit device 12 is an FPGA. An example of such logic is illustrated in FIG. 12 and is discussed in more detail below.

Continuing with the discussion of the adder circuitry 200, the compressor circuitry 204 includes several half-adders (e.g., half-adder 208) that are utilized to logically shift one of the two inputs that are not carry-out values. More specifically, the compressor circuitry 204 may be 2:2 compressor circuitry that receives the bits of input A and input B (e.g., bits of subproducts of a column to be added together or bits of a sum generated by adding together two subproducts) other than those provided to the ternary adder 202 and produces two new outputs NA and NB, where NA has the alignment of A, and NB has the alignment of B left shifted by one position. For example, the compressor circuitry 208 may cause a "0" to be inserted into the least significant bit position of input B to generate output NB. Furthermore, as illustrated, each half-adder includes an XOR gate 210 and an AND gate 212. In the case of the half-adder 208, the AND gate 212 receives the bit of wordgrowth from the ternary adder (as indicated by "1").

Because the bits of the second output (e.g., output NB) have been left-shifted by one position relative to the second input (e.g., input B), the least significant bit of output NB may be thought of as being "free." In other words, the output of compressor circuitry 204 that is provided to the adder circuitry 206 may be input NA (having the same alignment as the input A) and input NB (having the alignment of input B left-shifted by one position). Furthermore, the carry-out bit (as indicated by "cout") from the ternary adder 202 may be provided to the adder circuitry 206 and treated as though it were the least significant bit of an input to be added.

The adder circuitry 206 includes binary (i.e., two-input) adders 214 (e.g., adders 214A-214D) which add the bits received from the compressor circuitry 204. In particular, each adder 214 may add two inputs (e.g., 26-bit values) as well as a carry-in value (e.g., a carry-out value received as a carry-in value from a preceding adder or, in the case of adder 214D, a carry-out values from the ternary adder 202). Accordingly, the adder circuitry 206 may be utilized to add the any bits of values that are in bit positions that are higher than n. For example, if n were equal to two, the adder circuitry 206 may be utilized to add the third least significant bit of inputs as well as any more significant bits of the inputs. As such, the adder circuitry 206 may be utilized to perform addition (e.g., binary addition) on bits of inputs that are not added by the ternary adder 202.

Before continuing to discuss FIG. 12, it should be noted that the adding circuitry 200 of FIG. 11 may only be a portion of the circuitry included in the ternary adder 202 of FIG. 10. For example, in other embodiments, the compression circuitry 204 may include more half-adders 208 (e.g., tens, hundreds, or thousands of half-adders 208) than those depicted in FIG. 11, and the adding circuitry 206 may include more adders 214 than those depicted in FIG. 11. For instance, there may be as many adders 214 as there are half-adders 208 in the compression circuitry 204. As such, the adding circuitry 200 may be tailored to perform addition on values having a certain number of bits, which may further reduce latency associated with performing modular multiplication operations as well as reduce the amount of area of the integrated circuit device 12 occupied by adder circuitry (or other circuitry utilized when performing multiplication operations).

Continuing with the drawings, FIG. 12 is a block diagram of ternary adder circuitry 240, which may be utilized as the ternary adder 202 in FIG. 11. More specifically, the ternary adder circuitry 240 may be utilized to add three inputs having five bits each (i.e., three inputs for which n is equal to five). As illustrated, the ternary adder circuitry 240 includes various types of logic blocks, such as XOR logic blocks 242, majority function blocks 244 (e.g., circuitry that outputs a "1" when more than half of the inputs are true (e.g., have values of "1")), and AND function blocks 246. Additionally, the ternary adder circuitry 240 includes adders 248 that receive outputs of some of the logic blocks as inputs and add the inputs. As illustrated, the adders 248 may each receive two inputs as well as a carry-in value and generate a sum and a carry-out value.

Keeping the foregoing discussion in mind, an example of an implementation of the multiplier circuitry 26 will now be discussed. In this example, the integrated circuit device 12 may be a programmable logic device. More specifically, the programmable logic device may be an FPGA. The multiplier circuitry 26 may be implemented using a combination of hard and soft logic of the FPGA. In other words, multiplication operations (e.g., modular multiplication operations) may be performed using a combination of circuitry on the FPGA that is generally not alterable or programmable to an end user (e.g., hard logic) as well as circuitry on the FPGA that is alterable or programmable by the end user (e.g., soft logic). In this example, the multiplier circuitry 26 may include one or more DSP blocks that are implemented in hard logic that are utilized to multiply inputs to generate subproducts. For instance, as discussed above, the DSP blocks may multiply generally lower precision values that are derived from two relatively higher precision values to be multiplied, and the subproducts are the values generated by the DSP blocks when performing multiplication operations utilizing the generally lower precision values. As such, the DSP blocks may generate the columns of subproducts discussed above.

The multiplier circuitry may also include adder circuitry, such as adder trees discussed herein, that are utilized to sum the columns of subproducts. The adder trees may be implemented in hard logic or soft logic of the FPGA, but for the purposes of the example currently being discussed, the adder trees are implemented in soft logic. Moreover, routing circuitry from the DSP blocks to the adder trees and the circuitry (e.g., logic blocks) that make up the adder trees themselves may be implemented utilizing soft logic of the FPGA. More specifically, there may be one adder tree for each column of subproducts that includes more than one subproduct.

As discussed above, the adder trees may include various types of adders such as binary and ternary adders. Furthermore, the adder trees for the columns may be communicatively coupled to one another, as described above, such that carry-out values associated with columns may be provided to another column (e.g., a binary or ternary adder of a column of higher significance that the column from which the carry-out value originates). For instance, the adder trees may include a combination of binary and ternary adders, including the implementation of a ternary adder illustrated in FIG. 11 that includes ternary adder circuitry, compressor circuitry (e.g., 2:2 compressor circuitry), and binary adder circuitry. Furthermore, as shown in FIG. 10 and also discussed above, the ternary adders included in the adder trees may receive two values that are either subproducts, derived from subproducts (e.g., sums of subproducts determined while determining a sum for an entire column of subproducts, or a combination thereof. The ternary adders may also receive a carry-in value that is a carry-out value generated by adder circuitry within another adder tree. Furthermore, the adder trees may ultimately generate sums of columns that include a single bit of wordgrowth (e.g., as depicted in FIG. 7).

The multiplier circuitry 26 may also include look-up tables that each receive a sum of a particular column. For example, look-up tables may receive values that include more bits than the values multiplied to generate the subproducts. In other words, the output (e.g., sum) of each column that has a rank higher than the input argument size may be provided to a look-up table that performs a modulo operation and outputs the modulus of the input.

The multiplier circuitry 26 may include additional adder circuitry, which may include adder trees, that are utilized to add the modulus values generated by the look-up tables. Furthermore, the additional adder circuitry may add the other values (e.g., sums from columns for which a modulus was not determined) with the modulus values. As discussed above (e.g., with respect to FIG. 6), the additional adder circuitry may sum modulus values in an order that is related to the number of subproducts of a column from which a given modulus value is generated. For example, columns with relatively fewer subproducts may be summed more quickly, meaning a modulus value for such columns may be generated more quickly than modulus values for columns having relatively higher numbers of subproducts.

Figure 13:
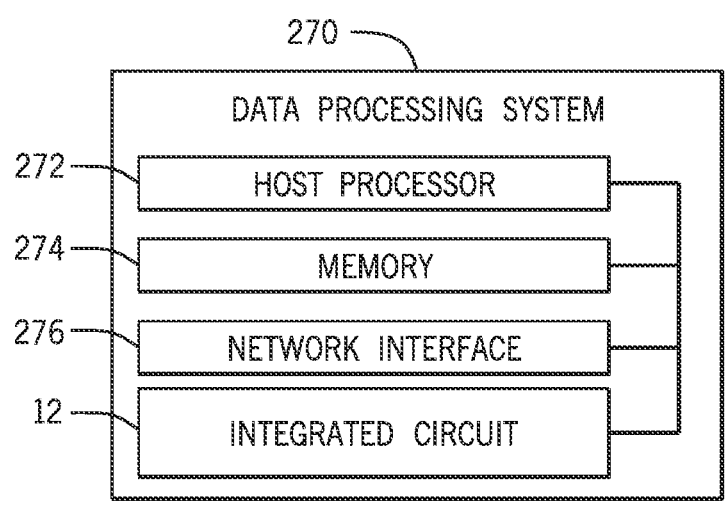
FIG. 13 is a data processing system, in accordance with an embodiment of the present disclosure.

Bearing the foregoing in mind, the integrated circuit 12 may include the multiplier circuitry 26, which may have interfaces to connect to other integrated circuit devices. In addition, the integrated circuit device 12 may be a data processing system or a component included in a data processing system. For example, the integrated circuit device 12 may be a component of a data processing system 270, shown in FIG. 13. The data processing system 270 may include a host processor 272 (e.g., a central-processing unit (CPU)), memory and/or storage circuitry 274, and a network interface 276. The data processing system 270 may include more or fewer components (e.g., electronic display, user interface structures, application specific integrated circuits (ASICs)). The host processor 272 may include any suitable processor, such as an INTEL® Xeon® processor or a reduced-instruction processor (e.g., a reduced instruction set computer (RISC), an Advanced RISC Machine (ARM) processor) that may manage a data processing request for the data processing system 270 (e.g., to perform encryption, decryption, machine learning, video processing, voice recognition, image recognition, data compression, database search ranking, bioinformatics, network security pattern identification, spatial navigation, cryptocurrency operations, or the like). The memory and/or storage circuitry 274 may include random access memory (RAM), read-only memory (ROM), one or more hard drives, flash memory, or the like. The memory and/or storage circuitry 274 may hold data to be processed by the data processing system 270. In some cases, the memory and/or storage circuitry 274 may also store configuration programs (bitstreams) for programming the integrated circuit device 12. The network interface 276 may allow the data processing system 270 to communicate with other electronic devices. The data processing system 270 may include several different packages or may be contained within a single package on a single package substrate. For example, components of the data processing system 270 may be located on several different packages at one location (e.g., a data center) or multiple locations. For instance, components of the data processing system 270 may be located in separate geographic locations or areas, such as cities, states, or countries.

In one example, the data processing system 270 may be part of a data center that processes a variety of different requests. For instance, the data processing system 270 may receive a data processing request via the network interface 276 to perform encryption, decryption, machine learning, video processing, voice recognition, image recognition, data compression, database search ranking, bioinformatics, network security pattern identification, spatial navigation, digital signal processing, or some other specialized task.

Furthermore, in some embodiments, the multiplier circuitry 26 and data processing system 270 may be virtualized. That is, one or more virtual machines may be utilized to implement a software-based representation of the multiplier circuitry 26 and data processing system 270 that emulates the functionalities of the multiplier circuitry 26 and data processing system 270 described herein. For example, a system (e.g., that includes one or more computing devices) may include a hypervisor that manages resources associated with one or more virtual machines and may allocate one or more virtual machines that emulate the multiplier circuitry 26 or data processing system 270 to perform multiplication operations and other operations described herein.

Accordingly, the techniques described herein enable multiplication (e.g., modular multiplication) to be performed more quickly (i.e., with a reduced latency), and the circuitry utilized to perform multiplication may occupy less physical space on an integrated circuit device compared to other circuitry that may also be utilized to perform multiplication. For example, Ternary addition, where available, can greatly reduce the latency of the overall structure of the circuitry utilized to perform (modular) multiplication operations. This may be half the latency of using two-input adders. For example, a reduction of nine elements would use four two-input levels of adders but only two levels when ternary adders are utilized in the manner described herein. Thus, even though utilized ternary adders can be routing intensive, the ternary structure described herein that is split into a combinatorial portion and a carry based portion may significantly reduce latency. Indeed, although the number of levels in the nine element reduction are the same as in the two-input case, the alternate levels being combinatorial may significantly ease placement, thus resulting in a lower latency. As such, technical effects of the present disclosure include modular multiplication being performed with reduced latency while using circuitry that utilized reduced amount of space on an integrated circuit device.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible, or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

Example Embodiments of the Disclosure

The following numbered clauses define certain example embodiments of the present disclosure.

Clause 1
An integrated circuit device comprising:
multiplier circuitry configured to determine a plurality of columns of subproducts by multiplying a plurality of values, wherein the plurality of columns of subproducts comprises a plurality of subproducts and each column of the plurality of columns comprises one or more subproducts of the plurality of subproducts; and
adder circuitry configured to determine a plurality of sums, wherein each sum of the plurality of sums is a sum of one column of the plurality of columns, wherein a first portion of the adder circuitry associated with a first column of the plurality of columns is configured to receive a first value associated with the first column, a second value associated with the first column, and a third value associated with a second column of the plurality of columns that differs from the first column, wherein the third value is a carry-out value generated by a second portion of the adder circuitry associated with the second column of the plurality of columns.

Clause 2
The integrated circuit device of clause 1, comprising one or more lookup-tables configured to generate a plurality of modulus values from a portion of the plurality of sums.

Clause 3
The integrated circuit device of clause 2, comprising second adder circuitry configured to determine a sum of the plurality of modulus values.

Clause 4
The integrated circuit device of clause 3, wherein:
the plurality of modulus values comprises:
a first modulus value associated with a third column of the plurality of columns having a first portion of the plurality of subproducts;
a second modulus value associated with a fourth column of the plurality of columns having a second portion of the plurality of subproducts, wherein the second portion of the plurality of subproducts includes more subproducts than the first portion of the plurality of subproducts;
a third modulus value associated with a fifth column of the plurality of columns having a third portion of the plurality of subproducts, wherein the third portion of the plurality of subproducts includes more subproducts than the second portion of the plurality of subproducts; and
a fourth modulus value associated with a sixth column of the plurality of columns having a fourth portion of the plurality of subproducts, wherein the fourth portion of the plurality of subproducts includes more subproducts than the third portion of the plurality of subproducts; and
the second adder circuitry is configured to determine a first sum of the first modulus value and the second modulus before the third modulus value, the fourth modulus value, or both are determined.

Clause 5
The integrated circuit device of clause 4, wherein the second adder circuitry is configured to:
determine a second sum of the third modulus value and the fourth modulus value after determining the first sum; and
determine a third sum of the first sum and the second sum after determining the second sum.

Clause 6
The integrated circuit device of clause 1, wherein the first portion of the adder circuitry comprises:
ternary adder circuitry configured to add a first portion of the first value, a second portion of the second value, and the third value, wherein the first portion of the first value, the second portion of the second value, and the third value each include a first number of bits;
compressor circuitry communicatively coupled to the ternary adder, wherein the compressor circuitry is configured to receive a first remaining portion of the first value and a second remaining portion of the second value, wherein the first remaining portion of the first value and the second remaining portion of the second value each include a second number of bits, wherein the second number of bits is greater than the first number of bits; and
binary adder circuitry communicatively coupled to the compressor circuitry, wherein the binary adder circuitry is configured to output a sum of the first remaining portion of the first value and the second remaining portion of the second value.

Clause 7
The integrated circuit device of clause 6, wherein:
the compressor circuitry is configured to left-shift bits of the second remaining portion of the second value; and
the binary adder circuitry is configured to receive a second carry-out value generated by the ternary adder circuitry.

Clause 8
The integrated circuit device of clause 1, wherein the integrated circuit device comprises a field-programmable gate array (FPGA).

Clause 9
The integrated circuit device of clause 8, wherein the multiplier circuitry comprises one or more digital signal processing (DSP) blocks of the FPGA.

Clause 10
The integrated circuit device of clause 8, wherein:
the multiplier circuitry is implemented on hard logic of the FPGA; and
the adder circuitry is implemented on soft logic of the FPGA.

Clause 11
The integrated circuit device of clause 10, wherein the adder circuitry comprises:
a ternary adder implemented on the soft logic of the FPGA;
compressor circuitry implemented on the soft logic of the FPGA;
binary adder circuitry implemented on the soft logic of the FPGA; or
a combination thereof.

Clause 12
A method, comprising:
determining, via multiplier circuitry of an integrated circuit device, a plurality of columns of subproducts by multiplying a plurality of values, wherein the plurality of columns of subproducts comprises a plurality of subproducts and each column of the plurality of columns comprises one or more subproducts of the plurality of subproducts; and
determining, via adder circuitry of the integrated circuit device, a plurality of sums, wherein each sum of the plurality of sums is a sum of one column of the plurality of columns, wherein determining the plurality of sums comprises:
receiving, via a first portion of the adder circuitry associated with a first column of the plurality of columns, a first value associated with the first column, a second value associated with the first column, and a third value associated with a second column of the plurality of columns that differs from the first column, wherein the third value is a carry-out value generated by a second portion of the adder circuitry associated with the second column of the plurality of columns; and
determining, via the first portion of the adder circuitry, a sum of a first portion of the first value, a second portion of the second value, and the third value.

Clause 13
The method of clause 12, comprising generating, via the integrated circuit device, a plurality of modulus values from a portion of the plurality of sums.

Clause 14
The method of clause 12, comprising adding the plurality of modulus values in an order based on latencies associated with determining the plurality of columns.

Clause 15
The method of clause 12, comprising determining, via the first portion of the adder circuitry, a sum of a remaining portion of the first value and a remaining portion of the second value.

Clause 16
The method of clause 12, wherein the integrated circuit device comprises a programmable logic device.

Clause 17
A programmable logic device configurable to be programmed to perform modular multiplication, wherein, when programmed, the programmable logic device comprises:
multiplier circuitry configured to determine a plurality of columns of subproducts by multiplying a plurality of values, wherein the plurality of columns of subproducts comprises a plurality of subproducts and each column of the plurality of columns comprises one or more subproducts of the plurality of subproducts; and
adder circuitry at least partially implemented in programmable logic of the programmable logic device, wherein the adder circuitry is configured to determine a plurality of sums, wherein each sum of the plurality of sums is a sum of one column of the plurality of columns, wherein a first portion of the adder circuitry associated with a first column of the plurality of columns is configured to receive a first value associated with the first column, a second value associated with the first column, and a third value associated with a second column of the plurality of columns that differs from the first column, wherein the third value is a carry-out value generated by a second portion of the adder circuitry associated with the second column of the plurality of columns.

Clause 18
The programmable logic device of clause 17, wherein the multiplier circuitry comprises digital signal processing (DSP) circuitry that is implemented in a non-programmable portion of the programmable logic device.

Clause 19
The programmable logic device of clause 17, wherein:
the third value comprises a first number of bits;
the first portion of the adder circuitry comprises a look-up table configured to receive a first input, second input, and third input that each have the first number of bits, wherein the first input is a first portion of the first value, the second input is a second portion of the second value, and the third input is the third value.

Clause 20
The programmable logic device of clause 17, wherein the programmable logic device comprises a field-programmable gate array (FPGA).

What is claimed is:
1. An integrated circuit device comprising:
multiplier circuitry configured to determine a plurality of columns of subproducts by multiplying a plurality of values, wherein the plurality of columns of subproducts comprises a plurality of subproducts and each column of the plurality of columns comprises one or more subproducts of the plurality of subproducts; and
adder circuitry configured to determine a plurality of sums, wherein each sum of the plurality of sums is a sum of one column of the plurality of columns, wherein a first portion of the adder circuitry associated with a first column of the plurality of columns is configured to receive a first value associated with the first column, a second value associated with the first column, and a third value associated with a second column of the plurality of columns that differs from the first column, wherein the third value is a carry-out value generated by a second portion of the adder circuitry associated with the second column, and wherein the first portion of the adder circuitry comprises:
ternary adder circuitry configured to add the first portion of the first value, a second portion of the second value, and the third value, wherein the first portion of the first value, the second portion of the second value, and the third value each include a first number of bits;

compressor circuitry communicatively coupled to the ternary adder circuitry, wherein the compressor circuitry is configured to receive a first remaining portion of the first value and a second remaining portion of the second value, wherein the first remaining portion of the first value and the second remaining portion of the second value each include a second number of bits, wherein the second number of bits is greater than the first number of bits; and binary adder circuitry communicatively coupled to the compressor circuitry, wherein the binary adder circuitry is configured to output a sum of the first remaining portion of the first value and the second remaining portion of the second value.

2. The integrated circuit device of claim 1, comprising one or more lookup-tables configured to generate a plurality of modulus values from a portion of the plurality of sums.

3. The integrated circuit device of claim 2, comprising second adder circuitry configured to determine a sum of the plurality of modulus values.

4. The integrated circuit device of claim 3, wherein:
the plurality of modulus values comprises:
a first modulus value associated with a third column of the plurality of columns having a first portion of the plurality of subproducts;
a second modulus value associated with a fourth column of the plurality of columns having a second portion of the plurality of subproducts, wherein the second portion of the plurality of subproducts includes more subproducts than the first portion of the plurality of subproducts;
a third modulus value associated with a fifth column of the plurality of columns having a third portion of the plurality of subproducts, wherein the third portion of the plurality of subproducts includes more subproducts than the second portion of the plurality of subproducts; and
a fourth modulus value associated with a sixth column of the plurality of columns having a fourth portion of the plurality of subproducts, wherein the fourth portion of the plurality of subproducts includes more subproducts than the third portion of the plurality of subproducts; and
the second adder circuitry is configured to determine a first sum of the first modulus value and the second modulus value before the third modulus value, the fourth modulus value, or both are determined.

5. The integrated circuit device of claim 4, wherein the second adder circuitry is configured to:
determine a second sum of the third modulus value and the fourth modulus value after determining the first sum; and
determine a third sum of the first sum and the second sum after determining the second sum.

6. The integrated circuit device of claim 1, wherein:
the compressor circuitry is configured to left-shift bits of the second remaining portion of the second value; and
the binary adder circuitry is configured to receive a second carry-out value generated by the ternary adder circuitry.

7. The integrated circuit device of claim 1, wherein the integrated circuit device comprises a field-programmable gate array (FPGA).

8. The integrated circuit device of claim 7, wherein the multiplier circuitry comprises one or more digital signal processing (DSP) blocks of the FPGA.

9. The integrated circuit device of claim 7, wherein:
the multiplier circuitry is implemented on hard logic of the FPGA; and
the adder circuitry is implemented on soft logic of the FPGA.

10. The integrated circuit device of claim 7, wherein the ternary adder circuitry is implemented on soft logic of the FPGA, the compressor circuitry is implemented on the soft logic of the FPGA, the binary adder circuitry implemented on the soft logic of the FPGA, or a combination thereof.

11. A method comprising:
determining, via multiplier circuitry of an integrated circuit device, a plurality of columns of subproducts by multiplying a plurality of values, wherein the plurality of columns of subproducts comprises a plurality of subproducts and each column of the plurality of columns comprises one or more subproducts of the plurality of subproducts; and
determining, via adder circuitry of the integrated circuit device, a plurality of sums, wherein each sum of the plurality of sums is a sum of one column of the plurality of columns, wherein determining the plurality of sums comprises:
receiving, via a first portion of the adder circuitry associated with a first column of the plurality of columns, a first value associated with the first column, a second value associated with the first column, and a third value associated with a second column of the plurality of columns that differs from the first column, wherein the third value is a carry-out value generated by a second portion of the adder circuitry associated with the second column of the plurality of columns;
determining, via the first portion of the adder circuitry, a sum of a first portion of the first value, a second portion of the second value, and the third value; and
generating, via the integrated circuit device, a plurality of modulus values from a portion of the plurality of sums, wherein the plurality of modulus values are added in an order based on latencies associated with determining the plurality of sums.

12. The method of claim 11, comprising determining, via the first portion of the adder circuitry, a sum of a remaining portion of the first value and a remaining portion of the second value.

13. The method of claim 11, wherein the integrated circuit device comprises a programmable logic device.

14. The method of claim 11, wherein the first portion of the adder circuitry comprises:
ternary adder circuitry configured to add the first portion of the first value, the second portion of the second value, and the third value, wherein the first portion of the first value, the second portion of the second value, and the third value each include a first number of bits;
compressor circuitry communicatively coupled to the ternary adder circuitry, wherein the compressor circuitry is configured to receive a first remaining portion of the first value and a second remaining portion of the second value, wherein the first remaining portion of the first value and the second remaining portion of the second value each include a second number of bits, wherein the second number of bits is greater than the first number of bits; and binary adder circuitry communicatively coupled to the compressor circuitry, wherein the binary adder circuitry is configured to output a sum of the first remaining portion of the first value and the second remaining portion of the second value.

15. The method of claim 11, the plurality of modulus values comprises:
a first modulus value associated with a third column of the plurality of columns having a first portion of the plurality of subproducts; and
a second modulus value associated with a fourth column of the plurality of columns having a second portion of the plurality of subproducts, wherein the second portion of the plurality of subproducts includes more subproducts than the first portion of the plurality of subproducts.

16. A programmable logic device configurable to be programmed to perform modular multiplication, wherein, when programmed, the programmable logic device comprises:
multiplier circuitry configured to determine a plurality of columns of subproducts by multiplying a plurality of values, wherein the plurality of columns of subproducts comprises a plurality of subproducts and each column of the plurality of columns comprises one or more subproducts of the plurality of subproducts; and
adder circuitry at least partially implemented in programmable logic of the programmable logic device, wherein the adder circuitry is configured to determine a plurality of sums, wherein each sum of the plurality of sums is a sum of one column of the plurality of columns, wherein a first portion of the adder circuitry associated with a first column of the plurality of columns is configured to receive a first value associated with the first column, a second value associated with the first column, and a third value associated with a second column of the plurality of columns that differs from the first column, wherein the third value is a carry-out value generated by a second portion of the adder circuitry associated with the second column of the plurality of columns, and wherein the first portion of the adder circuitry comprises:
ternary adder circuitry configured to add a first portion of the first value, a second portion of the second value, and the third value, wherein the first portion of the first value, the second portion of the second value, and the third value each include a first number of bits;
compressor circuitry communicatively coupled to the ternary adder circuitry, wherein the compressor circuitry is configured to receive a first remaining portion of the first value and a second remaining portion of the second value, wherein the first remaining portion of the first value and the second remaining portion of the second value each include a second number of bits, wherein the second number of bits is greater than the first number of bits; and
binary adder circuitry communicatively coupled to the compressor circuitry, wherein the binary adder circuitry is configured to output a sum of the first remaining portion of the first value and the second remaining portion of the second value.

17. The programmable logic device of claim 16, wherein the multiplier circuitry comprises digital signal processing (DSP) circuitry that is implemented in a non-programmable portion of the programmable logic device.

18. The programmable logic device of claim 16, wherein:
the third value comprises a first number of bits;
the first portion of the adder circuitry comprises a look-up table configured to receive a first input, second input, and third input that each have the first number of bits, wherein the first input is the first portion of the first value, the second input is the second portion of the second value, and the third input is the third value.

19. The programmable logic device of claim 16, wherein the programmable logic device comprises a field-programmable gate array (FPGA).

20. The programmable logic device of claim 19, wherein the ternary adder circuitry is implemented on soft logic of the FPGA, the compressor circuitry is implemented on the soft logic of the FPGA, the binary adder circuitry implemented on the soft logic of the FPGA, or a combination thereof.

* * * * *